United States Patent [19]

Tanioka et al.

[11] Patent Number: 5,798,810
[45] Date of Patent: *Aug. 25, 1998

[54] METHOD FOR TREATING AN ALIGNING FILM FOR A LIQUID CRYSTAL DISPLAY ELEMENT AND A METHOD FOR PREPARING A LIQUID CRYSTAL DISPLAY ELEMENT

[75] Inventors: Satoshi Tanioka; Shizuo Murata, both of Ichiharashi; Makoto Kono, Chinoshi; Masayuki Hirano, Hamamatsushi, all of Japan

[73] Assignees: Chisso Corporation, Osaka; Iinuma Gauge Mfg. Co., Ltd., Naganoken; Hamamatsu Photonics K.K., Shizuokaken, all of Japan

[ * ] Notice: The term of this patent shall not extend beyond the expiration date of Pat. No. 5,625,475.

[21] Appl. No.: 738,492

[22] Filed: Oct. 28, 1996

Related U.S. Application Data

[63] Continuation of Ser. No. 429,102, Apr. 26, 1995, Pat. No. 5,625,475.

[30] Foreign Application Priority Data

| Apr. 28, 1994 | [JP] | Japan | 6-91783 |
| Aug. 4, 1994 | [JP] | Japan | 6-183579 |
| Aug. 5, 1994 | [JP] | Japan | 6-204631 |

[51] Int. Cl.$^6$ .................................. G02F 1/1337
[52] U.S. Cl. .................. 349/123; 428/1; 427/595
[58] Field of Search .................. 428/1; 427/595, 427/496; 349/123

[56] References Cited

U.S. PATENT DOCUMENTS

| 5,009,489 | 4/1991 | Eguchi et al. | 350/341 |
| 5,256,456 | 10/1993 | Ogawa | 428/1 |
| 5,262,882 | 11/1993 | Hikmet | 359/75 |
| 5,625,475 | 4/1997 | Tanioka et al. | 428/1 |

*Primary Examiner*—Alexander Thomas
*Attorney, Agent, or Firm*—Leydig, Voit & Mayer, Ltd.

[57] ABSTRACT

A method for treating an aligning film for a liquid crystal display element and a method for preparing a liquid crystal display element are proposed.

The said treating method comprises rubbing a specified aligning film formed on a transparent substrate with a transparent electrode and thereafter radiating soft X-ray for 2 seconds or more in gas. The said preparing method comprises arranging a transparent electrode on a pair of transparent substrates, forming an aligning film consisting of an organic high molecular compound on the said transparent electrode, treating the said aligning film by a rubbing treatment, assembling the substrates face to face each other via a spacer, and then sealing a liquid crystal material.

By a method for treating an aligning film according to the invention, it is possible to lower display unevenness of a liquid crystal display element and to improve an yield of product.

13 Claims, 15 Drawing Sheets

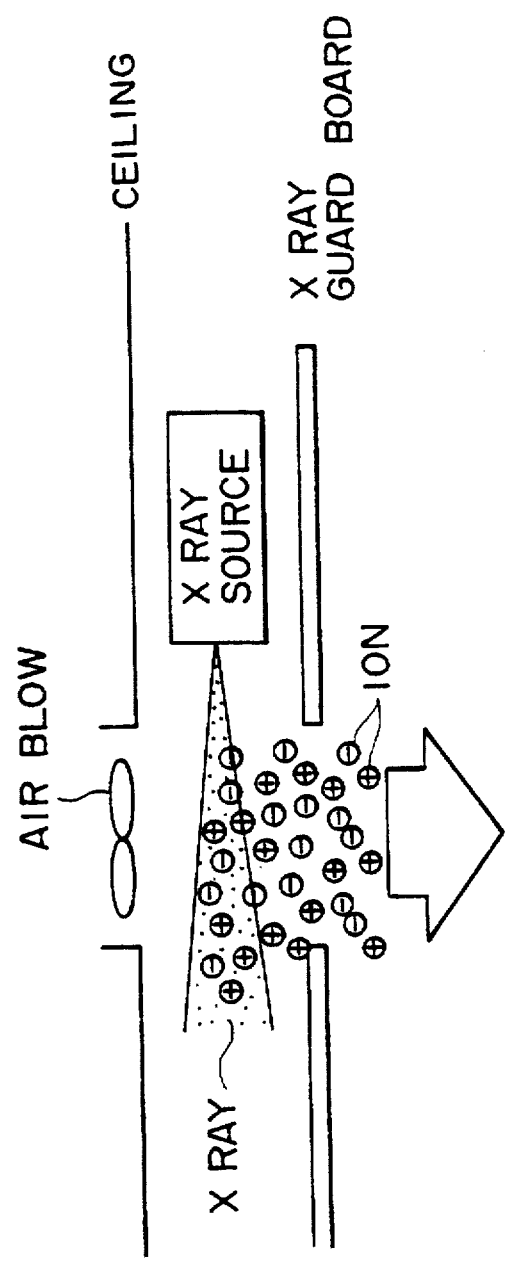
F I G. 12

METHOD FOR TREATING AN ALIGNING FILM FOR A LIQUID CRYSTAL DISPLAY ELEMENT AND A METHOD FOR PREPARING A LIQUID CRYSTAL DISPLAY ELEMENT

This disclosure is a continuation of U.S. patent application Ser. No. 08/429,102, filed Apr. 26, 1995 now U.S. Pat. No. 5,625,475.

FIELD OF THE INVENTION

This invention relates to a method for treating an aligning film for a liquid crystal display element with soft X-ray, a method for preparing a liquid crystal display element, and a liquid crystal display element prepared by the said method. In more detail, the invention relates to a method for treating an aligning film for a liquid crystal display element characterized by radiating with soft X-rays in a gas after carrying out an aligning treatment, a method for preparing a liquid crystal display element with improved display quality and yield which comprises a step for radiating with soft X-rays in a gas after carrying out an aligning treatment of an aligning film, as well as a liquid crystal display element prepared by the said preparation method.

DESCRIPTION OF PRIOR ART

Liquid crystal display devices are actively used in OA machines such as personal computers and word processors, because their driving voltages are low and also they are light in weight and high in display area. Liquid crystal display elements used for these applications are required to be suitable for character displays and drawing displays, which inevitably tend to a large display area, a multiple pixel and high preciseness, so that a method for preparing a liquid crystal display element having high quality and without any display defect is required.

As the liquid crystal display element, there is generally used a twisted nematic mode in which an orientation direction of nematic liquid crystal molecules is twisted by 90 degrees. One obtained by increasing the twist angle of the above-mentioned liquid crystal molecules to 180 to 300 degrees is known as a super twisted nematic mode. Further, in order to carry out a matrix display or a color display etc., recently a MIM (metal-insulating phase-metal) element for carrying out ON-OFF of many pixel electrodes and a liquid crystal display element of active matrix type twisted nematic mode using TFT (an electric field effect mode thin film transistor) have been developed actively.

Problems to be solved by the Invention

As the aligning films used in such liquid crystal display elements, organic materials such as polyimide and polyamide etc. are mainly used. Polyimide aligning film is a material having a large surface polarity, and it easily absorbs ionic or polar impurities because the surface of the aligning film has been activated, particularly after an aligning treatment. A part with adsorbed impurities may vary in aligning ability of the aligning film, or impurities may act as a condenser, or electrical double layer, stable at an interface between the liquid crystal and the aligning film may be changed, all of which become causes of display unevenness of the liquid crystal display element in image displaying use.

The display unevenness of the liquid crystal display element varies from unevenness in brightness, contrast or chromaticity present in a quite small part of an image plane to those present entirely in the image plane. For example, there may be mentioned (1) dust unevenness produced around fine dusts which have been mixed into the liquid crystal display element, (2) sealing agent unevenness produced around a sealing agent of the liquid crystal display element, (3) semicircular unevenness produced around a liquid crystal pouring inlet of the liquid crystal display element, and (4) washing unevenness due to impurities which have been mixed into the liquid crystal display element during washing of the liquid crystal display element.

Recently, dust unevenness caused by fine dusts in air, particularly aliphatic acids produced from human bodies, has become a large problem. With progress in a cleaning technology, large dusts are seldom mixed into liquid crystal display elements, but it is still difficult to remove fine dusts completely. Even in the case of such dusts as fine as about 1 micron mixed into, ionic or polar impurities may be eluted from the dusts, which is considered to effect surroundings and appear markedly as visible unevenness.

Lately, in order to remove such fine dusts, there have been carried out dry washing treatments using a nozzle body injectable in an air-wiper way after an aligning treatment, ultrasonic cleaner dry washing treatment by using gas with added ultrasonic vibration, or a wet washing treatment by means of pure water or organic solvents. In order to increase a washing power, it is general to combine physical washing methods such as brushing, jet spraying and ultrasonic wave washing methods etc., which results in effective removal of fine dusts. However, it is difficult to remove fine dusts completely in the dry washing treatment, and it was pointed out that a very small quantity of impurities is contained in a washing liquid in the wet washing treatment and it is also difficult to remove them completely. The washing unevenness caused by impurities contained in the washing liquid becomes a new problem.

Furthermore, in addition to trials for lowering impurities which are mixed into the element, it has been proposed to control an adsorbing ability of an aligning film and decrease an effect of the impurities. Japanese Patent Open-laid Specification Hei 1-185617 discloses a method to prevent display unevenness of a liquid crystal panel by fluorinating an aligning film to control adsorption of impurities on the aligning film surface. However, the method described in the specification is effective in controlling adsorption of the impurities, but the surface state of the aligning film is drastically changed by the fluorinating treatment, which results in a problem of deterioration in an aligning ability of the aligning film.

As forces acting when ionic or polar impurities are adsorbed on the aligning film surface, there may be considered those by hydrogen bonding, dipole—dipole interaction and coulomb—coulomb interaction etc. Since these interactions are generally increased more in the case of more polar components, adsorption of the impurities is considered as controllable by decreasing polar components in surface energy of the aligning film.

As methods for decreasing polar components in surface energy of the aligning film, there may be mentioned (1) a method for adjusting a molecular structure of an aligning film or adding an additive in an aligning film, (2) a method for treating with a surface treatment agent after forming an aligning film, and (3) a method for radiating ultraviolet ray under an atmosphere in which oxygen or ozone is present after carrying out an aligning treatment. Among these, methods of (1) and (2) are not preferable, since characteristics of the aligning film in itself such as an aligning ability or an electric characteristics are changed much. The method (3) is not preferable, since the aligning film becomes deteriorated by radiation of ultraviolet ray.

On one hand, in addition to the unevenness problem of the liquid crystal display element caused by adsorption of impurities, an extremely high static electricity such as 6 to 20 kV produced during a preparation step of a liquid crystal display element becomes a big problem. And, as harmful effects by static electricity, there may be mentioned a decrease in production yield due to electrostatic destruction or a deterioration of display quality due to adhesion of dusts. Generally, such static electricity has been dealt with by rising humidity to 60 to 70% by using an unsuitable humidifier or by mounting an ineffective ion producing device, which are still unsatisfactory.

SUMMARY OF THE INVENTION

The invention is made in order to improve such disadvantages in the conventional techniques, and has objects to propose a method for treating an aligning film for a liquid crystal display element which is effective in lowering the surface energy of the aligning film and/or removing static electricity produced during a preparation step of the liquid crystal display element, a method for preparing a liquid crystal display element to lower display unevenness obtained by the above-mentioned treating method of the aligning film or to prevent electrostatic destruction and improve production yield, as well as a liquid crystal display element prepared by the method.

The method for treating an aligning film for a liquid crystal display according to the invention is characterized in that the aligning film consisting of an organic high molecular compound coated on a transparent substrate with a transparent electrode is subjected to a rubbing treatment and thereafter the aligning film is irradiated with soft X-rays in gas. That is, by irradiating with soft X-rays having a long wavelength, gaseous ions produced by the ionizing action of the X-rays are adsorbed on the aligning film to lower the concentration of polar components and the surface energy of the aligning film, so that display unevenness of the liquid crystal display element can be prevented. This may be understood as a phenomenon in which gaseous ions produced by soft X-ray radiation are adsorbed on an adsorption site in the surface activated with the aligning treatment and thus any impurities cannot be further adsorbed on the surface.

On one hand, it is also confirmed that static electricity produced during a rubbing treatment step or a transferring step can be removed easily and effectively by adsorbing gaseous ions produced by the ionization action of soft X-rays on the aligning film. Thus, soft X-ray radiation is also effective in preventing electrostatic destruction due to a static elimination effect and in improving production yield.

BRIEF DESCRIPTION OF THE DRAWINGS

FIG. 12 shows one example of the case in which soft X-rays are irradiated in an open area.

EXPLANATION OF DRAWING SYMBOLS

1: liquid crystal aligning apparatus

Figure 1:
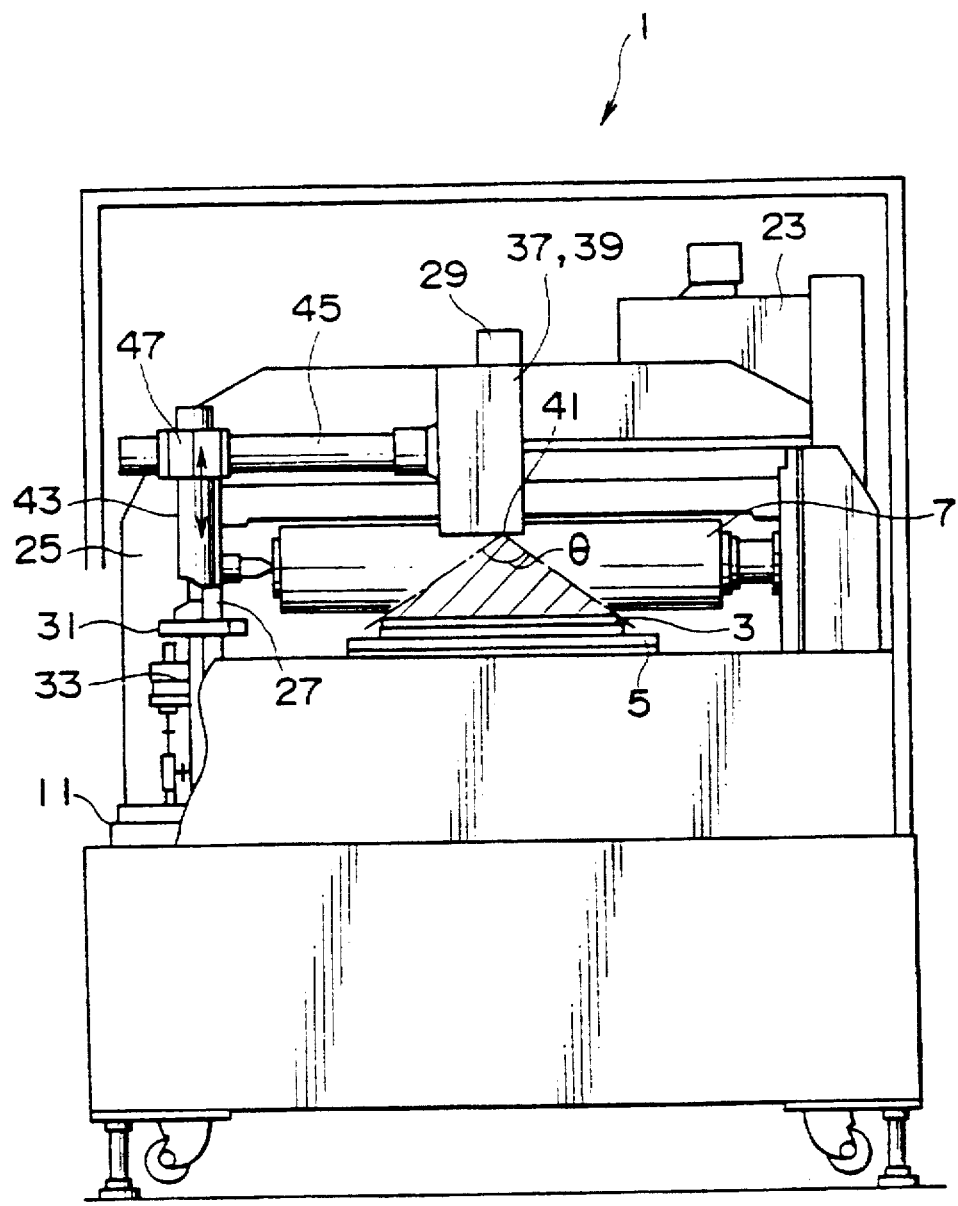
FIG. 1 is a front view of one example of a liquid crystal cell aligning apparatus according to the invention.

3: (organic high molecular membrane formed) transparent substrate

5: stage

7: roller

11: rack

13: rail

15: support

17: ball nut

19: nut member

21: ejector pin

23: motor

25: main pole member

27: bearing member

29: cylinder for lifting and falling

31: stopper block

33: stopper

35: operation member 37, 39: soft X-ray radiating device

41: radiation window

43: strut

45: support bar

47: coupling metal fitting

101: washing and drying device

103: (organic high molecular membrane formed) transparent substrate

105: transferring member

107: soft X-ray radiating device

107a: the first soft X-ray radiating device

107b: the second soft X-ray radiating device

111: rack

113: rail

115: stage

117: ball nut

119: operation part

121: roller conveyor

125: radiation window

127: strut

129: support bar

131: coupling metal fitting

135: nozzle body (slit head)
137: sucking window
139: variable supporting mechanism
143: thin plate
145: thick plate
147: connecting bolt
149: conduit
151: volt for adjustment of slit window

DETAILED DESCRIPTION OF THE INVENTION

The atmosphere under which soft X-rays are irradiated according to the invention is not limited, if it is in gas. As preferred gases, there may be mentioned oxygen, nitrogen, carbon dioxide, steam, helium, neon, argon and mixtures thereof.

The effect of lowering the surface energy of a material or eliminate static electricity by soft X-ray radiation according to the invention is not limited only to a surface treatment of an aligning film for a liquid crystal display element, and it can be used essentially for any material.

Soft X-rays having a long wave length used for the invention have low energy, so that the penetrating power through a material is very weak. The rays can be shielded easily by a transparent polyvinyl chloride plate etc. and are not dangerous to the human body, so that it is preferable from the viewpoint of a safe management. Further, it is considered advantageous in the respect that no deterioration of the aligning film is produced.

A soft X-ray irradiation apparatus used in the invention is not particularly limited if it could control an output stably at a soft X-ray energy of 1.25 to 9.5 kilo electron volts (keV). A radiation apparatus having such an output such that soft X-ray energy is 4 to 9.5 kilo electron volts (keV) is preferably used.

A soft X-ray irradiation period is preferably 2 seconds or more, and more preferably 5 to 300 seconds. In the case that the soft X-ray irradiation period is less than 2 seconds, a lowering of surface energy by soft X-ray irradiation becomes less. A soft k-ray irradiation distance is not particularly limited, but it is generally adjusted to 1500 mm or less, preferably 10 to 400 mm is suitable.

A method for preparing a liquid crystal display element according to the invention comprises steps for mounting a transparent electrode on a pair of transparent substrates to form an aligning film consisting of an organic high molecular compound on the said transparent electrode, rubbing the aligning film, assembling the substrates to face each other with a spacer disposed therebetween, and thereafter sealing a liquid crystal material, which method is characterized in that the aligning film is radiated with soft X-rays in gas during and/or after the rubbing treatment of the aligning film.

In the method for preparing the liquid crystal display element according to the invention, a dry or wet washing treatment may be carried out after the rubbing treatment. As washing methods, there may be mentioned brushing, jet spraying, steam washing or ultrasonic washing etc. These methods may be carried out individually or may be used jointly. As washing liquids, there may be used pure water, or various alcohols such as methyl alcohol, ethyl alcohol, isopropyl alcohol etc., aromatic hydrocarbons such as benzene, toluene, xylene etc., halogenated solvents such as methylene chloride etc. or ketones such as acetone, methyl ethyl ketone etc., but the liquids are not limited thereto. Of course, these washing liquids should be used with less impurities after sufficient purification.

Soft X-ray radiation on the aligning film is preferably carried out for 2 seconds or more, and the soft X-ray radiation can be carried out in any step, if it is during and/or after the rubbing treatment.

For example, the soft X-ray radiation apparatus useful in the invention can be employed on an aligning apparatus for liquid crystals equipped with a cylindrical roller which is disposed parallel to a transparent substrate surface with the aligning film formed via a specified electrode on one side of the transparent substrate and also includes a device to adjust the distance to the transparent substrate surface and a driving means for moving the roller relatively in a specified direction toward the above-mentioned transparent substrate with rotation.

One example of an aligning apparatus for liquid crystals equipped with a soft X-ray radiating device useful in the invention is illustrated with reference to the drawings.

Figure 2:
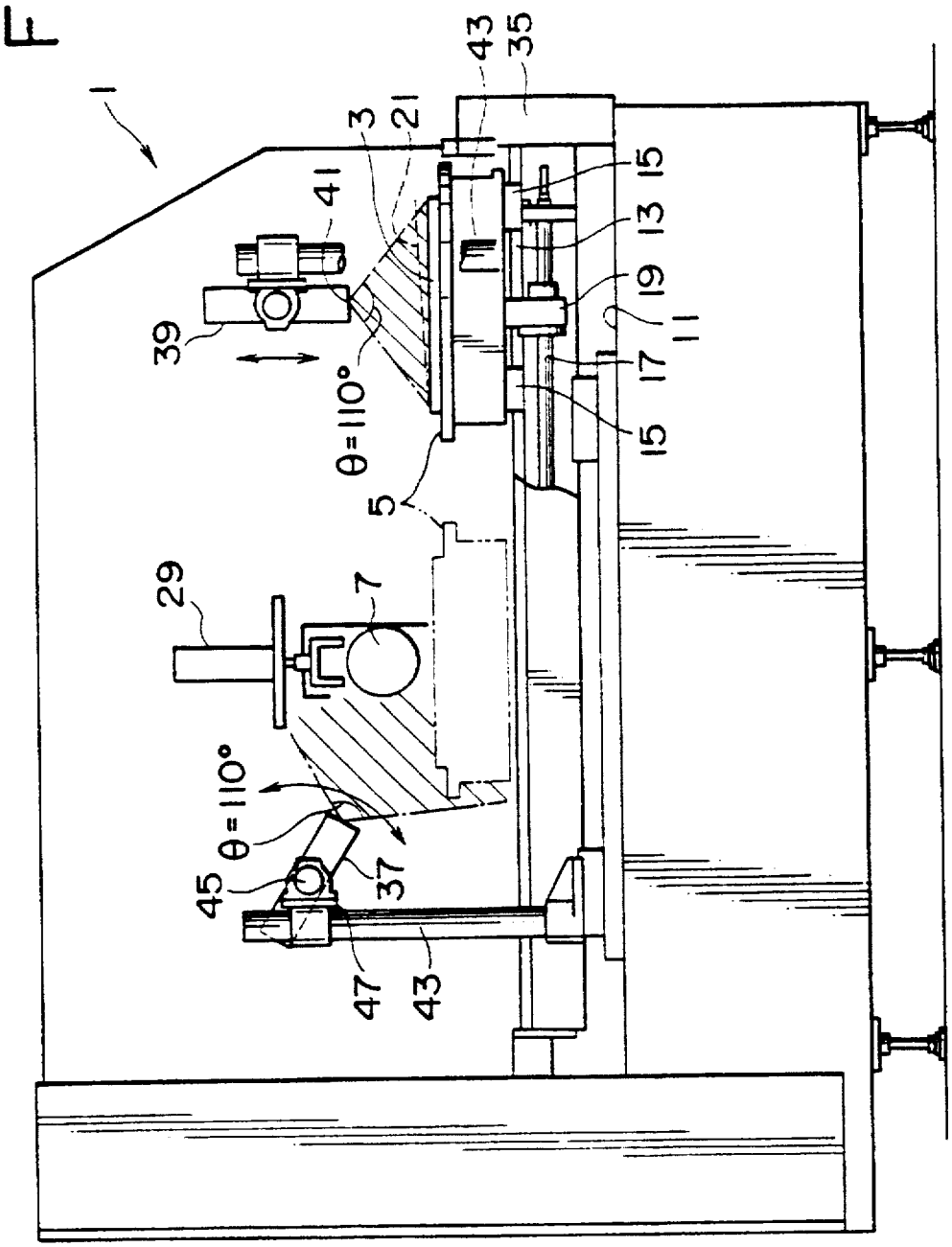
FIG. 2 is a side view of one example of a liquid crystal cell aligning apparatus according to the invention.
Figure 3:
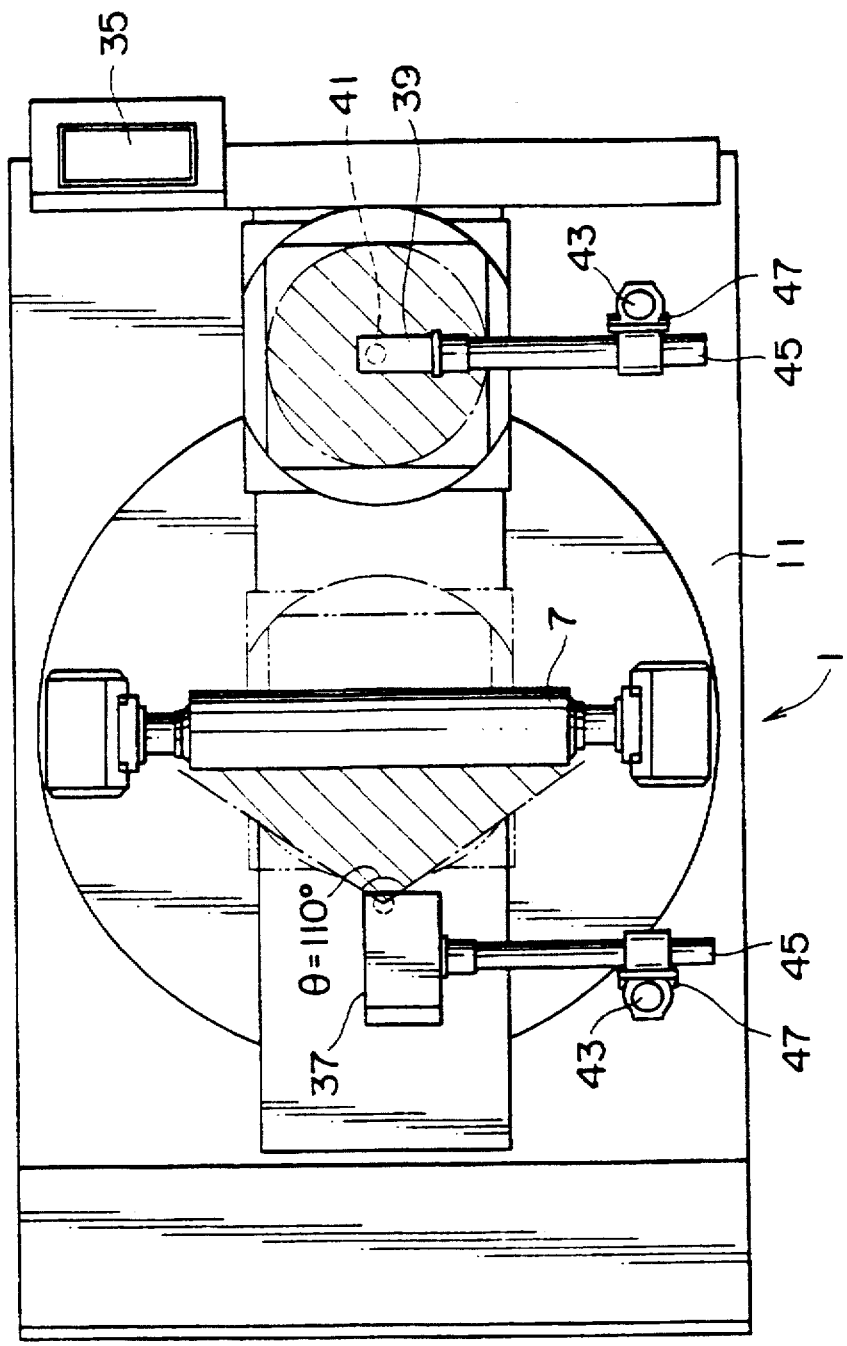
FIG. 3 is a plan view of one example of a liquid crystal cell aligning apparatus according to the invention.

FIGS. 1, 2 and 3 are a front view, a side view and a plan view of an aligning apparatus for liquid crystal (cell), respectively.

An aligning apparatus for liquid crystal 1 is the apparatus (rubbing machine) for aligning liquid crystal molecules of a liquid crystal cell which has an organic high molecular membrane (polyimide membrane) with a thickness of about 500 to 800 angstroms consisting of polyimide etc. formed via a specified electrode on one side of a transparent substrate 3 made of glass etc., and the apparatus consists basically of a variable stage 5 on which the substrate 3 is placed (for example by vacuum adsorption) with the organic high molecular membrane upside and a rotatable rubbing roller (hereinafter referred to as "roller") 7 which is movable and horizontally supported for contacting and connecting against the organic high molecular membrane of the transparent substrate 3 on the stage 5 and which is wound up via an adhesive etc. with a buffing material such as a rubbing cloth on the outer circumference.

The stage 5 is movably supported in front and rear directions (in FIG. 2, left and right directions) by means of a so-called straight guiding mechanism consisting of a pair of rails 13 and a support body 15 equipped therewith slidably, and also driven by a servomotor (not shown) via a so-called straight driving mechanism consisting of a ball nut 17 arranged between both rails 13 and a nut member 19 to be screwed with the ball nut. Herein, the stage 5 is constituted in such a way that it is rotatable at an optional angle against the rail 13, thus against a rack 11, and generally fixed at a specified angle by a stage rotating rock nut (not shown). Further, on the upper surface of the stage 5, an ejector pin 21 is filled and built in, which can lift up one side of the transparent substrate 3 in order to remove easily the transparent substrate 3 from the stage 5.

The roller 7 is rotated and driven by a motor 23 via a belt (not shown), and also supported via a bearing member 27 against a main pole part 25 (rack 11) in order to move in upward and downward directions translationally and driven upwardly and downwardly by a lifting and falling cylinder 29. Herein, its falling limit can be determined by contacting a stopper block 31 on the roller side with a stopper 33 adjustable in height on the rack 11 (main pole part 25) side, when the roller 7 is moved downwardly. That is, a gap between the roller 7 and the stage 5 (the transparent substrate with formed organic high molecular membrane) can be controlled.

By the above-mentioned constitution, the transparent glass substrate 3 with formed polyimide membrane which has been set on the stage 5 by a vacuum adsorption technique is subjected to an aligning treatment by falling the roller for a specified distance first with a pushing pressure of a start button (not shown) and then rotating it at a specified speed to move the stage at a specified speed.

In the present aligning apparatus for liquid crystal, two soft X-ray radiating devices (37, 39) are arranged in addition to the said constitution. The first soft X-ray radiating device 37 is to radiate the transparent substrate on the stage 5 when the stage 5 is positioned in a rubbing treatment (alignment) position actually carried out (approximately a center of apparatus 1 in the present example (see FIG. 2)) (in other words, during the rubbing treatment), and the second soft X-ray radiation device 39 is to radiate the transparent sub-substrate 3 on the stage 5 when the stage 5 is positioned in a preparation and waiting position (in FIG. 2, right side) (in other words, after the rubbing treatment). Herein, a radiation range (a shaded portion) of the soft X-ray radiating device 37 or 39 is intended to radiate conically soft X-ray in all directions at an angle of 110° (θ) from a radiation window 41, and any soft X-ray radiating device may be arranged at an optional height and at an optional angle on the rack 11, since (1) radiation strength increases inversely with the square of the distance and (2) an end of the radiation range is 20% less in strength than the center thereof. Stating concretely, they are rigidly supported, by means of a strut 43 mountable at an optional position on the rack 11, a support bar 45 arrangeable vertically to the strut 43 and a coupling metal fitting 47 of clamp type which can clamp and fix both in a movable way relative to one another.

Furthermore, the soft X-ray radiating device useful in the invention can be employed on a washing and drying apparatus equipped with a transferring part which can move the transparent substrate within the apparatus and a washing and drying part which can jet clean gas with a pressure of 1 to 5 kg/cm$^2$ toward the substrate and also can remove unnecessary substances.

Preferably, the first and the second soft X-ray radiating devices which can radiate soft X-ray against the transparent substrate respectively can be employed in front and rear positions of the washing and drying part in the washing and drying apparatus.

Also preferably, the soft X-ray radiating device useful in the invention can be employed on a washing and drying apparatus in such a way that clean gas to be jetted on the transparent substrate can be ionized.

Also preferably, the soft X-ray radiating device useful in the invention can be employed on a washing and drying apparatus equipped with a nozzle body which can jet clean gas in an air-wiper way and a sucking device with a sucking window which can remove unnecessary substances.

Also preferably, the soft X-ray radiating device useful in the invention can be employed on a washing and drying apparatus which is constituted for changing an angle between the transparent substrate and gas blown from the nozzle body within a range of 30 to 60 degrees.

One embodiment of the washing and drying apparatus equipped with the soft X-ray radiating device useful in the invention is illustrated as follows, with reference to the drawings.

Figure 4:
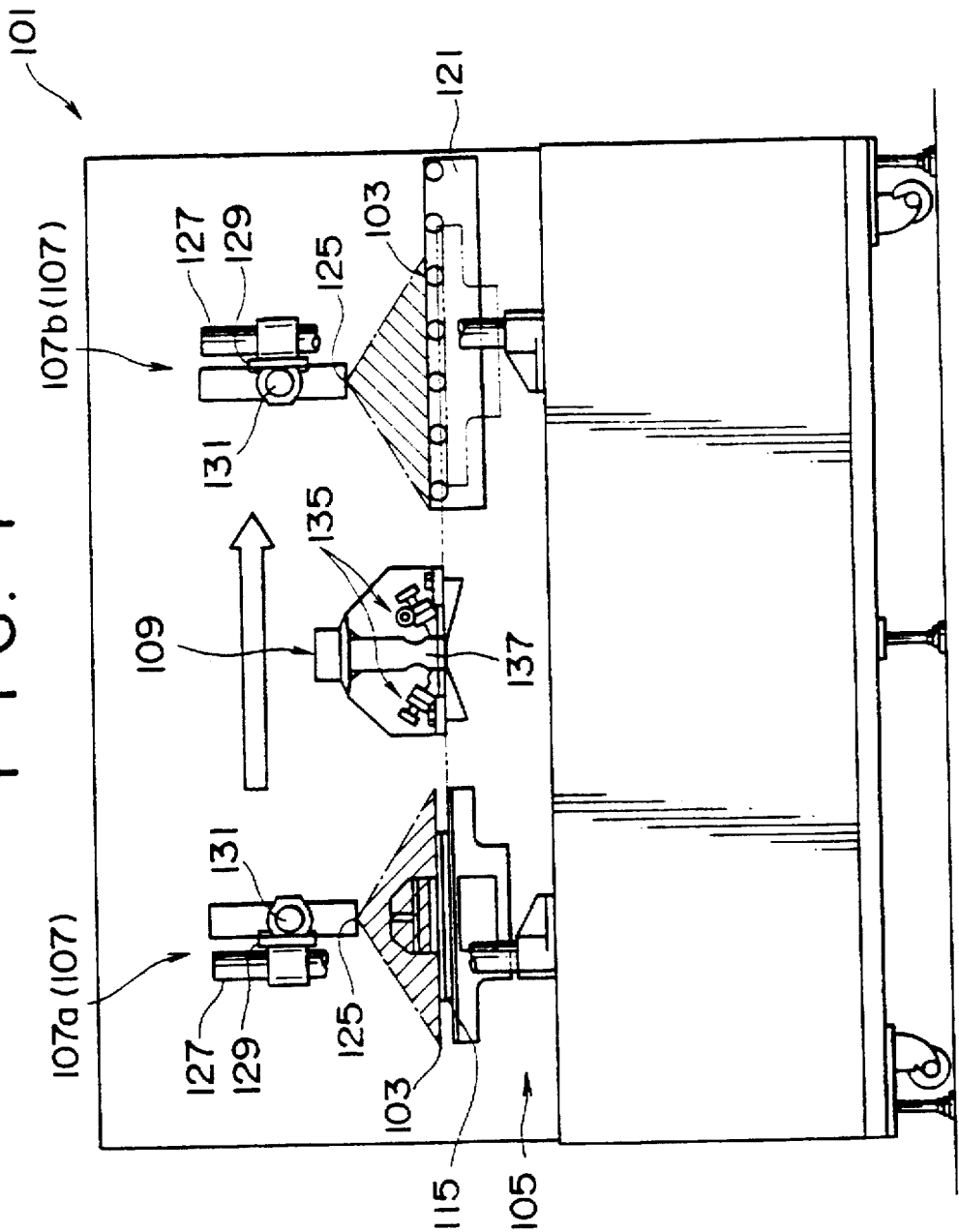
FIG. 4 is a front view of a washing and drying apparatus according to the invention.
Figure 5:
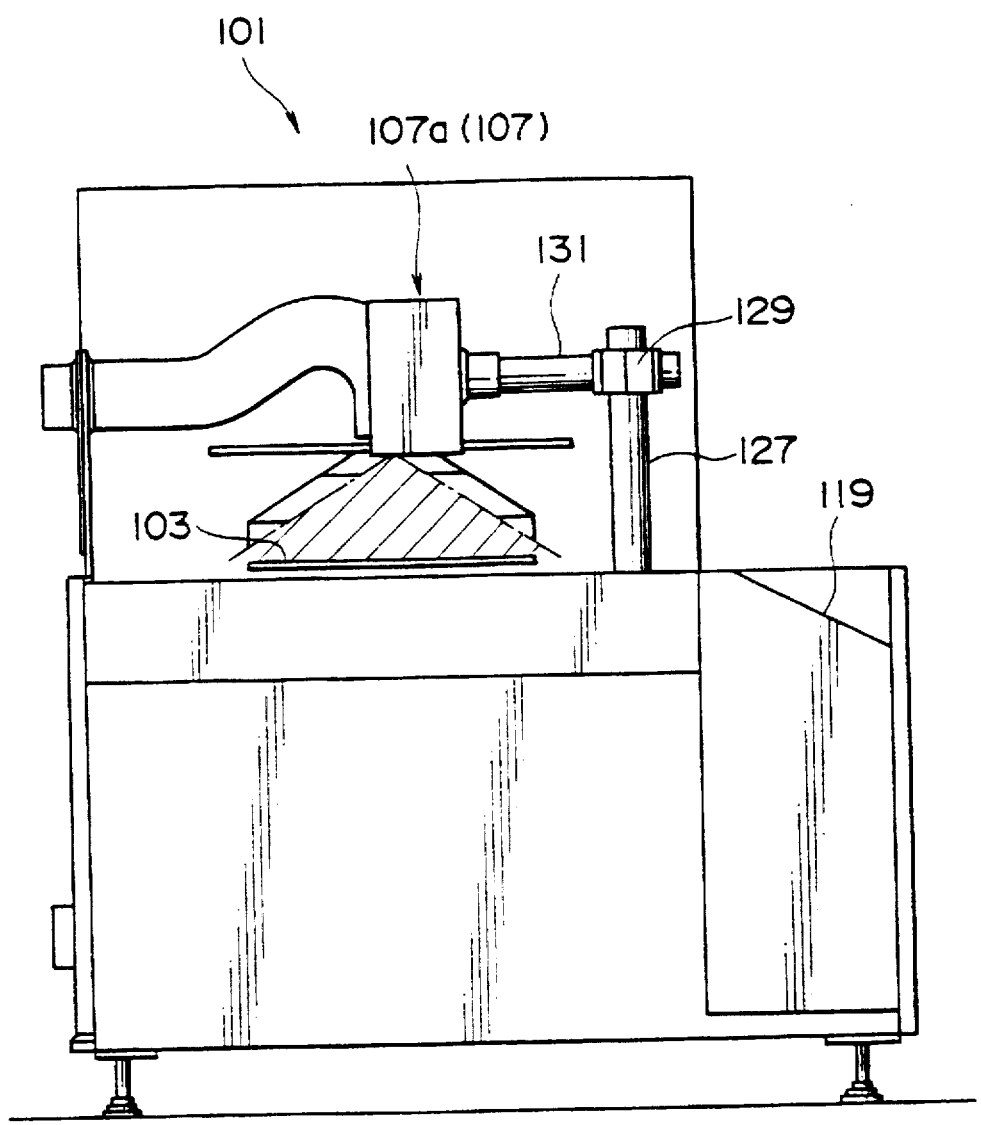
FIG. 5 is a side view of a washing and drying apparatus according to the invention.
Figure 6:
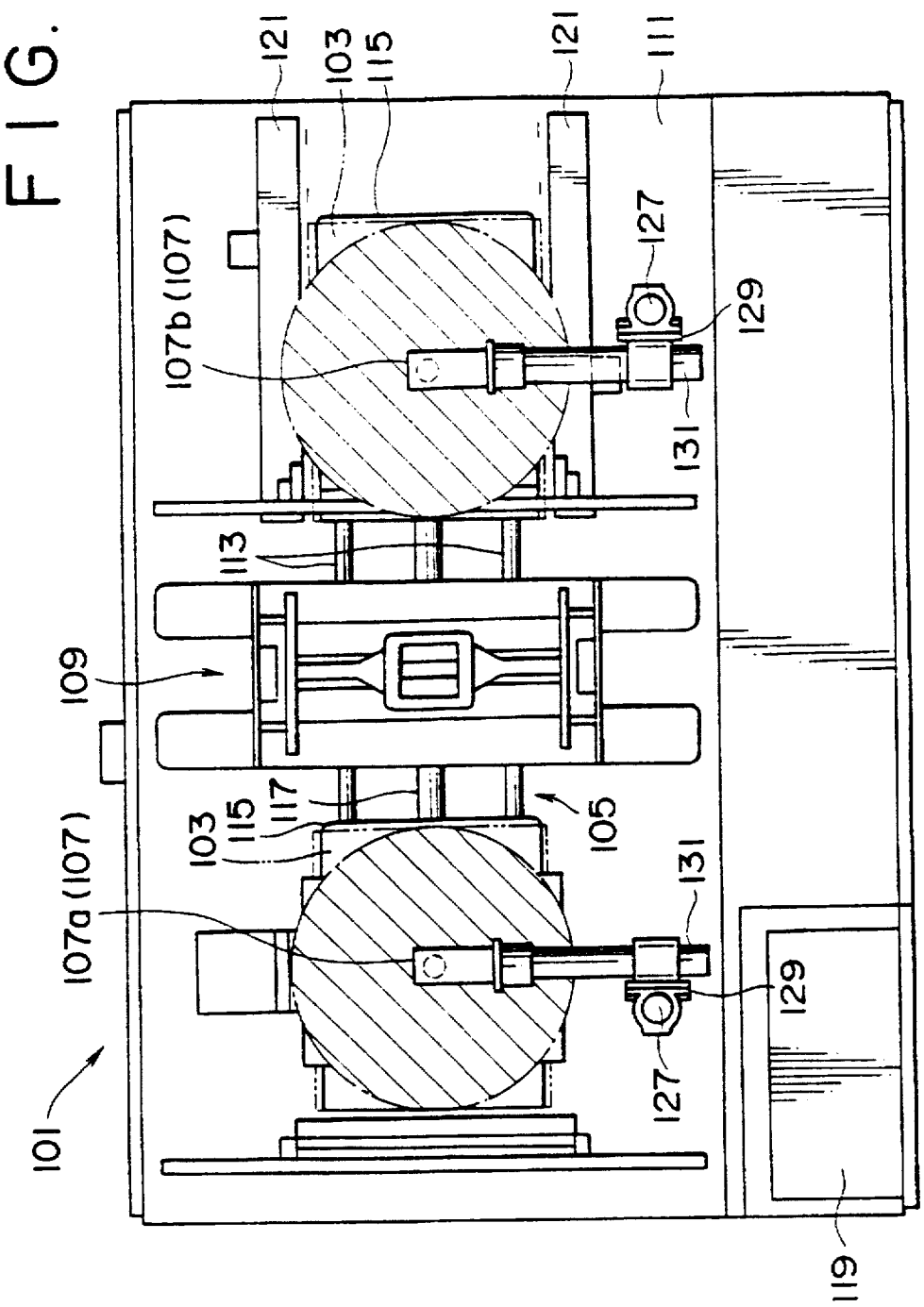
FIG. 6 is a plan view of a washing and drying apparatus according to the invention.

FIGS. 4, 5 and 6 are a front view, a side view and a plan view, respectively, of a soft X-ray radiating device useful in the invention.

A washing and drying apparatus 101 is the apparatus for washing and/or drying a transparent substrate 103 consisting of formed organic high molecular weight membrane (polyimide membrane) with a thickness of 500 to 800 angstroms made of polyimide etc. via a specified electrode on one side of the glass transparent substrate etc. The apparatus consists basically of a transferring part 105 to move the substrate 103 within the apparatus, a soft X-ray radiating device to radiate soft X-ray against the substrate 103 and a washing and drying part 109 to wash and dry the substrate 103.

First, in order to make understanding easier, these main constituting elements are illustrated in the given order.

(1) Transferring part 105

A transferring part 105 consists of a stage 115 in which the transparent substrate 103 is mounted (for example by vacuum adsorption) with an organic high molecular membrane upside and which is movably kept by a pair of rails 113 arranged on a rack 111 in parallel. The stage 115 is driven and controlled semiautomatically by a servomotor (not shown) via a ball nut 117 arranged at a center of both rails 113 in parallel and a nut member screwable therewith (not shown) under an operation of an operator at an operation part 119, and it is constituted in such a way that it can move go and back straightly between a left preparation position in FIG. 4 and a right exhaust position in the said Fig. The operator sets a substrate to be treated, and on the other hand, the already treated substrate 103 which is positioned at an exhaust position is transferred by totally lifting of a roller conveyor 121 which is positioned generally downward below the substrate 103 (in FIG. 4, during lifting) from the stage and conveyed out of the apparatus by the said action. Herein, in order to remove the substrate 103 easily from the stage 115, an ejector pin 121 (not shown) which can push up one side of the substrate ejectably may be filled and built in on the upper surface of the stage 115.

(2) Soft X-ray radiating device 107

In the present aligning apparatus for liquid crystal, soft X-ray radiating devices are arranged at two positions. The first soft X-ray radiating device 107a (107) is to radiate soft X-ray against the transparent substrate 103 on the stage 115 when the stage 115 is located at a preparation position (left side in FIG. 4) before a (dry) washing and drying treatment, and the second soft X-ray radiating device 107b (107) is to radiate soft X-ray against the transparent substrate 103 on the stage 115 when the stage 115 is located at an exhaust position (right side in FIG. 4). Herein, a radiation range (a shaded portion) of the soft X-ray radiating device 107 (107e, 107b) is intended to radiate soft X-ray conically in all directions at an angle of 110° (θ) from a radiation window 125, and any soft X-ray radiating device may be arranged at an optional height and at an optional angle on the rack 111, since (1) a radiation strength being increased inversely to a square of a distance and (2) an end of the radiation range is 20% less in strength than a center thereof. Stating concretely, they are rigidly supported by means of a strut 127 mountable at an optional position on the rack 111, a support bar 129 arrangeable vertically to the strut 127 and a coupling metal fitting 131 of clamp type which can clamp and fix both in a movable way relatively.

(3) Washing and drying part 109

Figure 7:
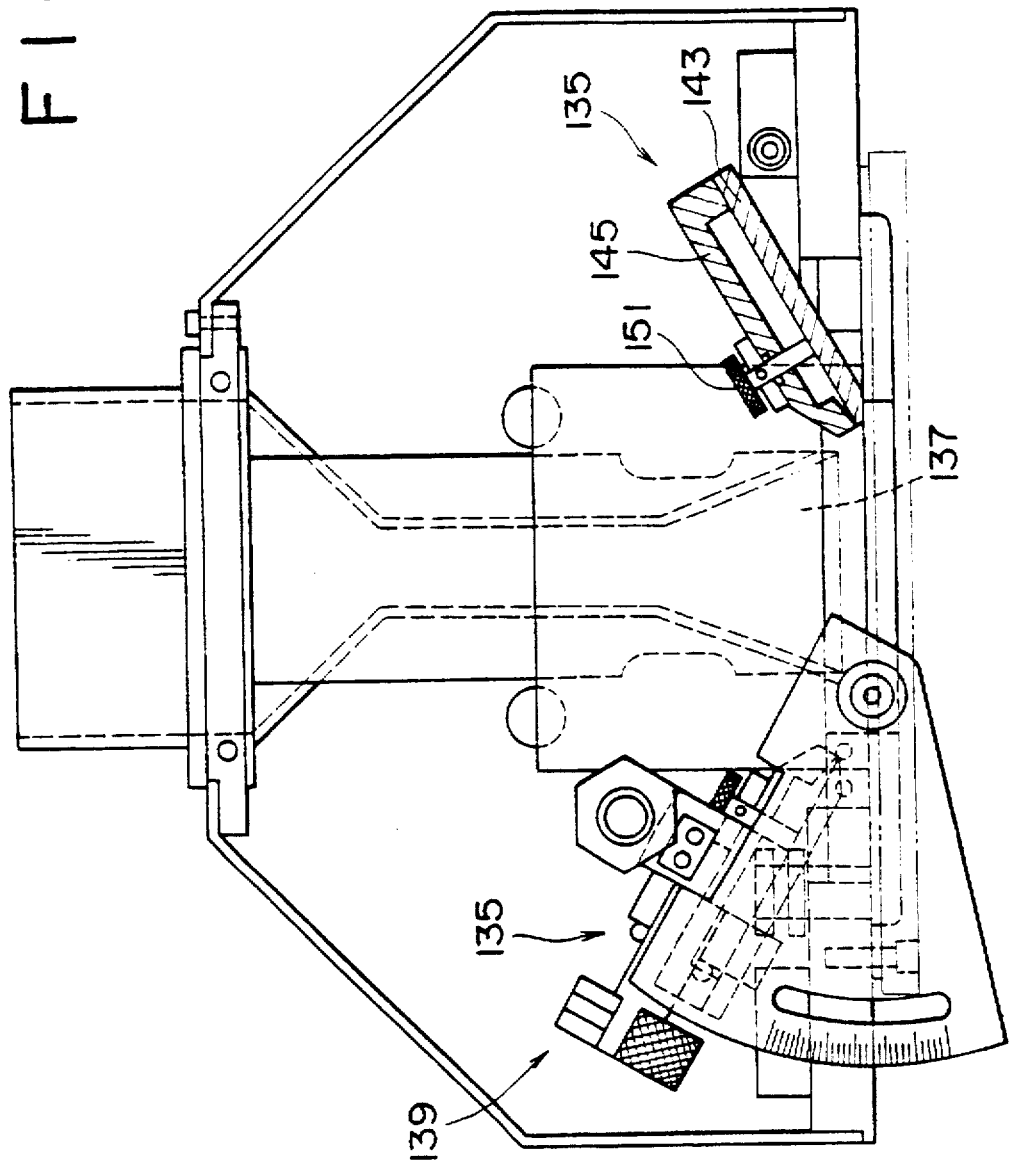
FIG. 7 is a front view of a washing and drying part.
Figure 8:
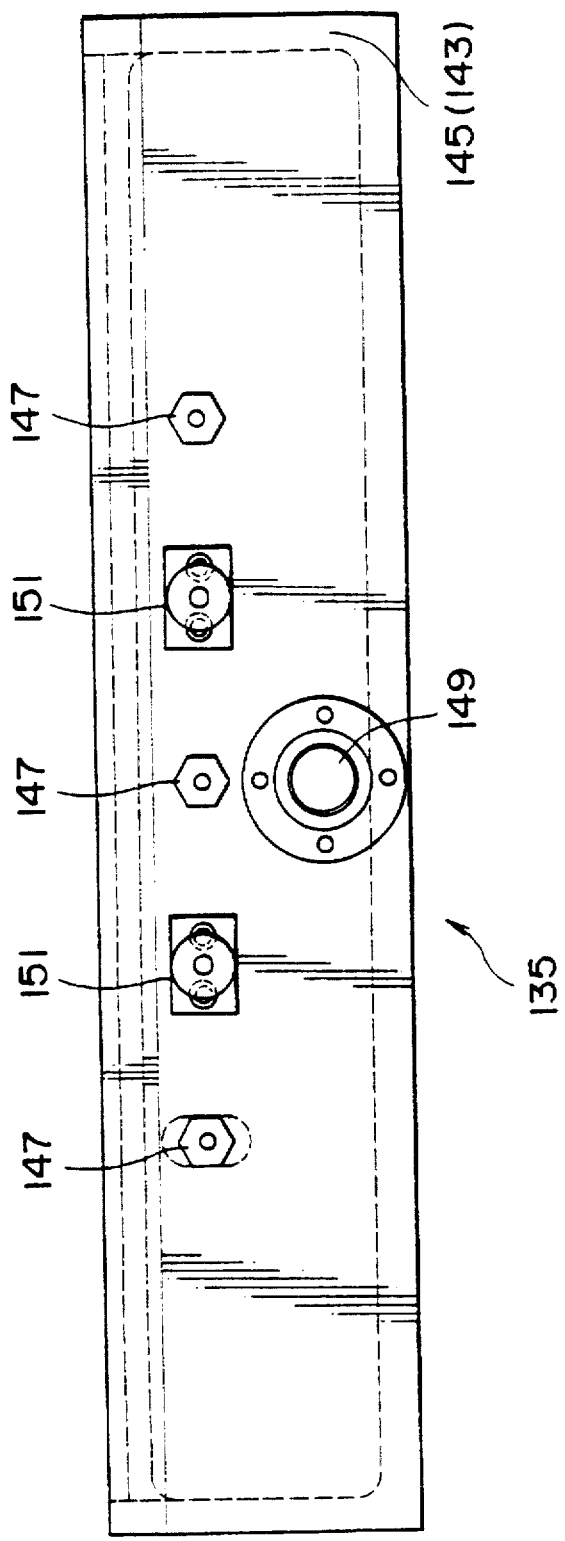
FIG. 8 is a plan view of a slit head.
Figure 9:
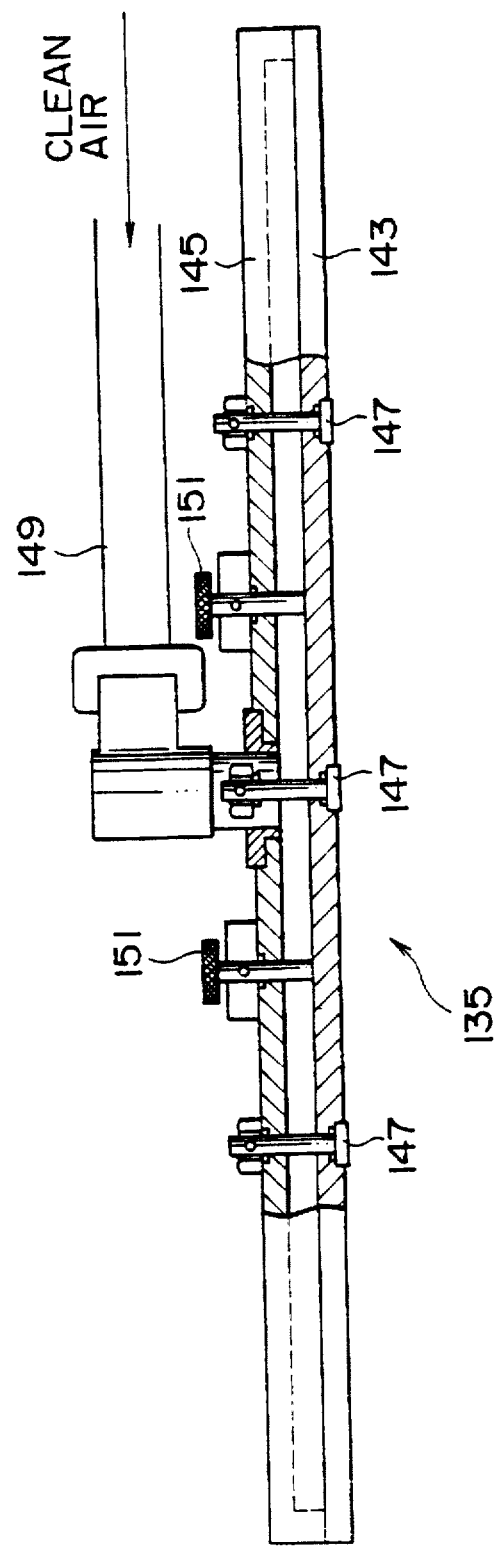
FIG. 9 is a top view of a slit head.
Figure 10:
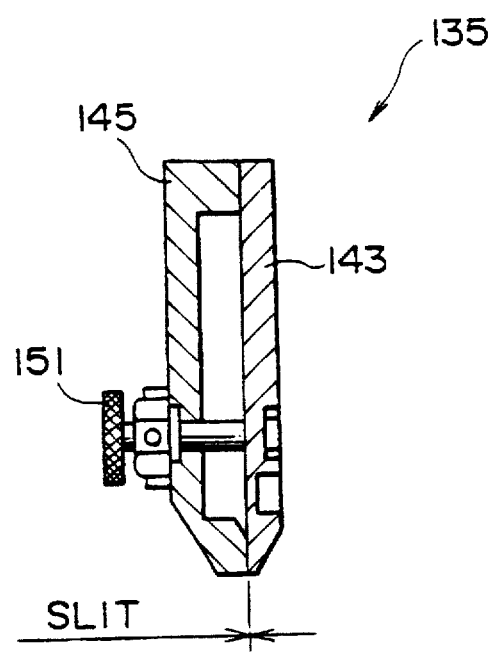
FIG. 10 is a side view of a slit head.

Nozzle bodies 135 (hereinafter referred to slit heads) which constitute important portions of a washing and drying part 109 and which can jet a specified gas (for example, clean air with a pressure of about 1 to 5 kg/cm$^2$) in an air-wiper way are arranged symmetrically in V style (viewed from front) with holding a sucking window 137 of a sucking device (main body is not shown) to suck unnecessary substances (dust etc.), wherein the sucking device is arranged at a center of the apparatus. As shown in FIG. 7, each slit heads 135 are supported respectively by means of variably supporting mechanisms 139 (in FIG. 7, only left one is shown) which can adjust a jetting angle (for example, 30 to 60 degrees) and adjust flow-in amount and flow-out amount in a jetting direction. As shown in FIGS. 8 to 10, the slit head 135 is constituted by fitting closely a rectangular thin plate 143 and a rectangular thick plate 145 with a box-shape hollow and coupling at three positions at about equal distance in the longer direction with pierced connecting bolts 147, and it is coupled to a specified gas origin which is not shown (for example, a clean air origin) via a conduit 149 screwed at a center of the side surface. From among fitting parts of two plates 143 and 145 which constitute the slit head 135, all parts except one side are sealed, and an open side part (a slit part) having a width size (for example, about 0.1 mm) with a specified accuracy constitutes a nozzle, and the nozzle is constituted in such a way to jet a specified gas against the substrate 103 at a timing and at a flow rate according to a specified control program in an air-wiper way. Herein, in order to carry out substantial control (adjustment) or equalization of jetting amount, the center part of the slit wherein the jetting amount tends to increase is narrowed by clamping bolts 151 (2 positions), for adjusting a slit width, which clamping bolts are screwed between coupling bolts 147. Now by arranging a soft X-ray radiating device (not shown) intended to ionize gas which is jetted from the slit part, static electricity producible at a collision moment of gas against the substrate 103 can be lowered effectively, which being practical and actual.

As to the washing and drying device 101 consisting of the above-mentioned main elements, its action is illustrated briefly as follows.

First, a glass substrate 103 with formed polyimide membrane is set accurately on a stage in a preparation position by vacuum adsorption. The substrate 103 before treatment is irradiated with soft X-rays by the first soft X-ray radiating device 107a (107).

Then, the stage 115 (substrate 103) is conveyed out by a pushing pressure of a start button in an operation part 119 via a ball nut 117 which is coupled to a servomotor, and passed through under two slit heads 135 at a specified speed. During passage of the substrate, the substrate 103 is washed and dried. That is, gas blown off slit parts of the both slit heads 135 collides with the substrate 103 to blow off dust and unnecessary solids, liquids and mixtures thereof which are adhered on the substrate surface, and also to dry the substrate in the case of the substrate being wet. Blown off dusts are sucked out of the apparatus by a sucking device (body is not shown) via a sucking aperture 137. Herein, gas to be jetted is desirably ionized itself as described above.

Then, when the substrate 103 (stage 115) which has been passed through the washing and drying part 109 arrives and is positioned at an exhaust position, the treated substrate 103 is radiated with soft X-ray by the second soft X-ray radiating device 107b (107).

Other modified embodiments and application embodiments of the cases using the soft X-ray radiating device are illustrated briefly as follows.

Figure 11:
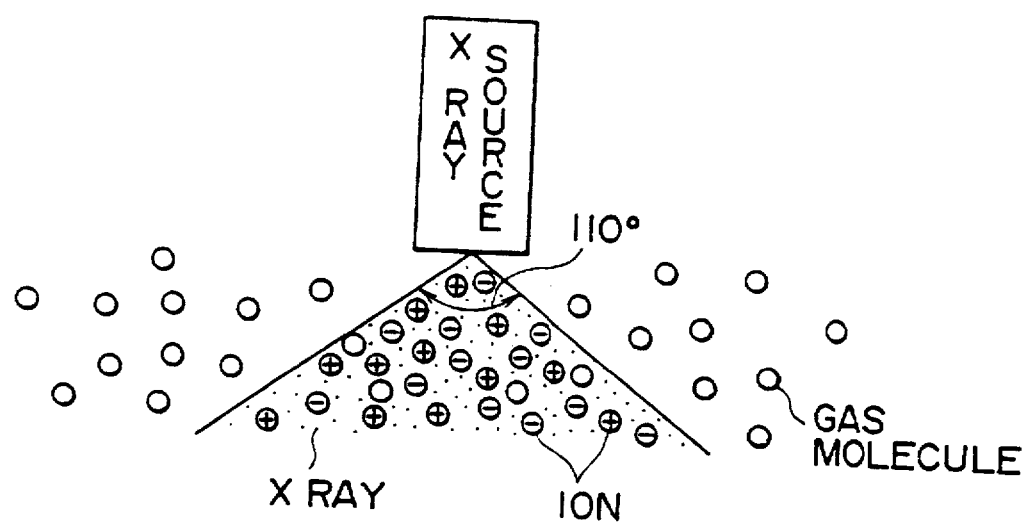
FIG. 11 illustrates a range in which ion being produced by soft X-ray radiation.
Figure 13:
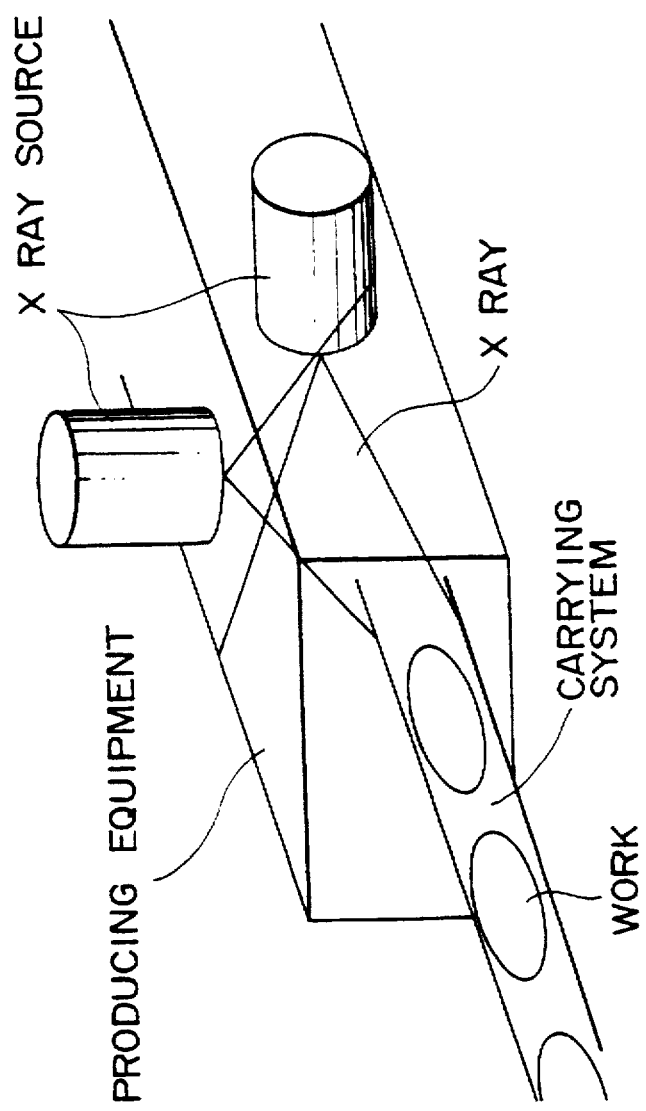
FIG. 13 shows one example of the case in which soft X-rays are irradiated in a manufacturing apparatus.

First, since production of gaseous ions by radiation with soft X-rays is noticed within a radiation range as shown in FIG. 11, an effect of X-rays can be improved, for example, by using an air blow together to enlarge the radiation range.

Furthermore, when irradiating with soft X-rays in an open area, an air blowing device can be arranged at about a right angle with respect to radiation from a soft X-ray origin as shown in FIG. 12, in order to jet air from a side direction and exhaust gaseous ions from an aperture of a soft X-ray protective plate. Alternatively, when irradiating with soft X-rays within a preparation apparatus, it is considered that a soft X-ray origin is arranged on a ceiling and a side surface and soft X-rays are radiated one above another from upper and side ways against a work object (for example a substrate) on a conveying system (for example a conveyor belt).

Furthermore, it is considered that as a mounting form of the soft X-ray radiating device a supporting mechanism of a soft X-ray radiating device can be made, for example, automatically oscillatable by means of a feedback control or followable to a stage, in order to obtain an optimum radiation range, for example, according to movement of the stage. Alternatively, it is considered that a supporting mechanism of a soft X-ray radiating device can be made automatically adjustable in height (fixing of a radiation distance) for example by means of a feedback control based on data such as a thickness of a transparent substrate which being automatically determined, in order to fix radiation strength.

Furthermore, a supporting mechanism of a soft X-ray radiating device can be made to vary in stepwise within a radiation angle (to 110°), in order to radiate soft X-rays concentrating at one part. Alternatively, it is considered that a diaphragm mechanism (for example, a slit) is mounted in front of a soft X-ray radiating device.

Furthermore, an interlock mechanism is mounted in order to prevent suffering of X-ray radiation in the case of soft X-ray radiation energy being 1.25 to 9.5 keV.

According to the invention, polyimide resins are preferably used as the materials for the aligning films. As polyimide resins, there are used those prepared by employing as precursors polyamic acids with structure units shown by general formula (1)

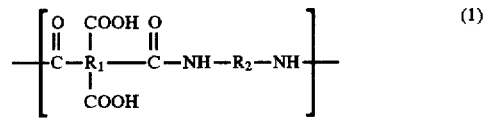

wherein, $R_1$ denotes a tetravalent alicyclic, aromatic or heterocyclic hydrocarbon residue optionally with a group such as a halogen etc., $R_2$ denotes a divalent hydrocarbon residue optionally with —O—, —S—, or a halogen atom or cyano group.

Namely, as the polyamic acids, there may be preferably used polyamic acids obtained by reacting tetracarboxylic dianhydrides having aromatic rings such as pyromellitic dianhydride or alicyclic tetracarboxylic dianhydrides such as cyclobutane tetracarboxylic dianhydride with diamino compounds.

As tetracarboxylic dianhydrides, there may be mentioned aromatic tetracarboxylic dianhydrides such as pyromellitic dianhydride, 3,3',4,4'-biphenyl tetracarboxylic dianhydride, 2,2',3,3'-biphenyl tetracarboxylic dianhydride, 2,3,3',4'-biphenyl tetracarboxylic dianhydride, 3,3',4,4'-benzophenone tetracarboxylic dianhydride, 2,3,3',4'-benzophenone tetracarboxylic dianhydride, 2,2',3,3'-benzophenone tetracarboxylic dianhydride, bis (3,4-dicarboxyphenyl) sulfonic dianhydride, 1,2,5,6-naphthalenetetracarboxylic dianhydride and 2,3,6,7-naphthalenetetracarboxylic dianhydride, and as alicyclic tetracarboxylic dianhydrides there may be mentioned dianhydrides of alicyclic tetracarboxylic acids having rings such as cyclobutane, cyclohexane, cyclooctane and bicyclooctane etc. as well as compounds having the following structural formula:

As diamino compounds, i.e. the other raw material for polyamic acids, there may be mentioned aromatic diamino compounds such as 1,1-bis[4-(4-aminophenoxy)phenyl]cyclohexane,
1,1-bis[4-(4-aminophenoxy)phenyl]-4-methylcyclohexane,
1,1-bis[4-(4-aminophenoxy)phenyl]-4-ethylcyclohexane,
1,1-bis[4-(4-aminophenoxy)phenyl]-4-propylcyclohexane,
1,1-bis[4-(4-aminophenoxy)phenyl]-4-butylcyclohexane,
1,1-bis[4-(4-aminophenoxy)phenyl]-4-pentylcyclohexane,
1,1-bis[4-(4-aminophenoxy)phenyl]-4-hexylcyclohexane,
1,1-bis[4-(4-aminophenoxy)phenyl]-4-heptylcyclohexane,
1,1-bis[4-(4-aminophenoxy)phenyl]-4-octylcyclohexane,
2,2-bis[4-(4-aminophenoxy)phenyl]propane,
2,2-bis[4-(4-aminophenoxy)phenyl]butane,
2,2-bis[4-(4-aminophenoxy)phenyl]pentane,
2,2-bis[4-(4-aminophenoxy)phenyl]hexane,
2,2-bis[4-(4-aminophenoxy)phenyl]octane,
2,2-bis[4-(4-aminophenoxy)phenyl]nonane,
2,2-bis[4-(4-aminophenoxy)phenyl]decane,
2,2-bis[4-(4-aminophenoxy)phenyl]dodecane,
1,1-bis[4-(4-aminobenzyl)phenyl]cyclohexane,
1,1-bis[4-(4-aminobenzyl)phenyl]-4-methylcyclohexane,
1,1-bis[4-(4-aminobenzyl)phenyl]-4-ethylcyclohexane,
1,1-bis[4-(4-aminobenzyl)phenyl]-4-propylcyclohexane,
1,1-bis[4-(4-aminobenzyl)phenyl]-4-butylcyclohexane,
1,1-bis[4-(4-aminobenzyl)phenyl]-4-pentylcyclohexane,
1,1-bis[4-(4-aminobenzyl)phenyl]methane,
4,4'-diaminophenyl ether,
4,4'-diaminophenyl methane,
4,4'-diaminophenyl sulphone,
4,4'-diaminophenyl sulfide,
4,4'-di(meta-aminophenoxy)diphenyl sulphone,
4,4'-(para-aminophenoxy)diphenyl sulphone,
ortho-phenylenediamine,
meta-phenylenediamine,
para-phenylenediamine,
benzidine,
2,2'-diaminobenzophenone,
4,4'-diaminobenzophenone,
4,4'-diaminodiphenyl-2,2'-propane,
1,5-diaminonaphthalene,
1,8-diaminonaphthalene, and
2,2-bis[4-(4-aminophenoxy)phenyl]hexamethylpropane,
as well as alicyclic diamino compounds such as 1,4-diaminocyclohexane and 4,4'-diaminodicyclohexylmethane etc.

However, tetracarboxylic dianhydrides and diamino compounds, that is, raw materials used in the invention, are not limited to the above-mentioned compounds. Furthermore, two or more acid anhydrides and diamino compounds can be used in combination.

Since a polyimide compound is generally insoluble in a solvent, in order to mount a polyimide aligning film according to the invention on a substrate, there is used a method for dissolving a polyamic acid obtained by condensation of precursors, that is tetracarboxylic dianhydride and a diamino compound, in a solvent, coating it on a substrate and thereafter heating to cause imidation. For example, the polyamic acid is dissolved in a solvent such as N-methyl-2-pyrrolidone (NMP), dimethylacetoamide (DMAc), dimethylformamide (DMF), dimethylsulfoxide (DMSO), butyl cellosolve (BC), ethylcarbitol, propylene glycol monobutyl ether, 3-methyl-3-methoxybutanol etc. to prepare a 0.1 to 30% by weight solution, preferably a 1 to 10% by weight solution, and then the solution is coated by means of a brushing method, a dipping method, a spin coating method, a spraying method or a printing method etc. to form a coated membrane on the substrate. After forming the coated membrane, the solvent is evaporated at 50° to 150° C., preferably 80° to 120° C., and thereafter heat treatment at 150° to 400° C., preferably 180° to 280° C., is carried out to cause a dehydration-ring closure reaction and arrange the liquid crystal aligning film which comprises polybenzylimide type high molecular membrane.

In the case that adhesion of the obtained high molecular membrane on the substrate is not good, the said adhesion may be improved by forming a high molecular membrane after carrying out a surface treatment with a silane coupling agent on the surface of the substrate. In such a way, the organic high molecular membrane is mounted on the surface of the substrate and thereafter the coated surface is rubbed with a cloth etc. in a specified direction, to obtain a liquid crystal aligning film.

On the substrate, a transparent electrode, for example ITO (indium oxide-tin oxide), is formed. Further, an insulating membrane can be formed for the purpose to prevent elution of alkali from the substrate under the electrode, or a polarized light plate, a color filter membrane or a light transmission preventing membrane can be mounted on a cell. These or other cell constituting elements can be used appropriately according to the construction of a conventional liquid crystal element.

Into the substrate used for making a cell is poured a liquid crystal, and thereafter a pouring aperture is sealed. Alternatively, a liquid crystal display element may be made by piling up and sealing a substrate after spraying a liquid crystal on the substrate, in order to prevent leakage of the liquid crystal.

As the liquid crystal used for the liquid crystal display according to the invention, there may be used a liquid crystal with an added dichroic dye, a ferroelectric liquid crystal or any liquid crystal which can be used for a general display element, in addition to a general nematic liquid crystal.

As components of the liquid crystal useful for the invention, there may be mentioned for example a liquid crystal compound expressed by the following general formula (2) or a liquid crystal compound expressed by the following general formula (3).

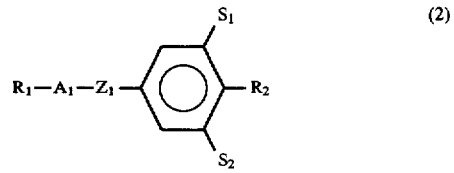

(2)

wherein, $R_1$ denotes a straight chain alkyl group with 1 to 10 carbon atoms or an alkenyl group with 2 to 10 carbon atoms; $R_2$ denotes a straight chain alkyl group or alkyloxy group with 1 to 10 carbon atoms, —CN, a fluorine atom, chlorine atom, —CF$_3$, —CHF$_2$, —OCF$_3$ or —OCHF$_2$; $S_1$ and $S_2$ denote a hydrogen atom, a fluorine atom, a chlorine atom, —CF$_3$, —CHF$_2$, —OCF$_3$ or —OCHF$_2$, which may be same or different each other; $Z_1$ denotes —COO—, —CH$_2$CH$_2$—, —C≡C— or a single bond; $A_1$ denotes

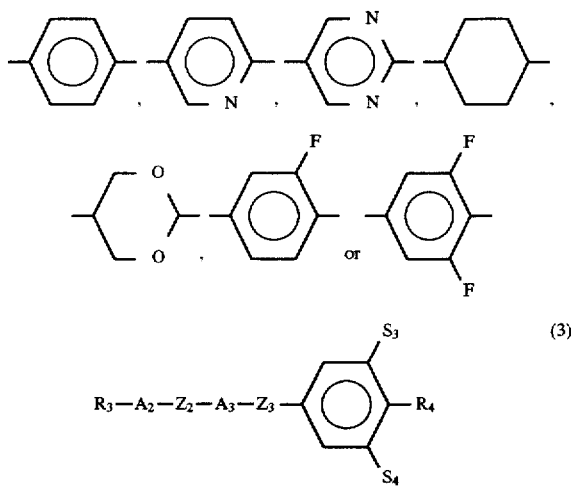

(3)

wherein, $R_3$ has the same meaning as $R_1$ in the general formula (2), $R_4$ has the same meaning as $R_2$ in the general formula (2); $S_3$ and $S_4$ have the same meanings as $S_1$ and $S_2$ in the general formula (2), which may be same or different each other; $Z_2$ and $Z_3$ may be same or different each other and have the same meanings as $Z_1$ in the general formula (2); and $A_2$ and $A_3$ have the same meanings as $A_1$ in the general formula (2), which may be same or different each other.

The said component of the liquid crystal composition may be a single component or a mixture of multiple components. As the liquid crystal mixture used for the liquid crystal display element according to the invention, compounds other than the above-mentioned ones can be used unless missing purposes.

Preferred embodiments according to the invention are described in items (a) to (q) as follows:

(a) a method for treating an aligning film, characterized in that a polyimide aligning film formed on a transparent substrate with a transparent electrode is subjected to a rubbing treatment and thereafter soft X-rays are irradiated for a period between 5 to 300 seconds on the aligning film in air.

(b) a method for treating an aligning film according to the preceding item, in which soft X-ray energy is 4 to 9.5 kilo electron volt (keV).

(c) a method for treating an aligning film according to the above-mentioned item (a), in which the distance between the aligning film and an origin of soft X-rays is 10 to 400 mm.

(d) a method for treating an aligning film according to the above-mentioned item (a), in which soft X-rays are irradiated from an origin having a soft X-ray energy of 4 to 9.5 keV on the aligning film located at a distance of 10 to 400 mm.

(e) a method for preparing a liquid crystal display element comprising steps for arranging a transparent electrode on a pair of transparent substrates, forming a polyimide aligning film, treating of the aligning film by rubbing, assembling the substrates to face each other with a spacer disposed therebetween, and then applying and sealing to a substrate a liquid crystal material wherein the aligning film subjected to a rubbing treatment and thereafter the aligning film is irradiated with soft X-rays in air for 5 to 300 seconds.

(f) a method for preparing a liquid crystal display element according to the above-mentioned item wherein the aligning film is irradiated with soft X-rays during and/or after a rubbing treatment by using an aligning apparatus for a liquid crystal equipped with a cylindrical roller which is parallel to a transparent substrate surface and is capable of adjusting the distance to the substrate surface, a driving means for moving the roller relatively in a specified direction toward the above-mentioned transparent substrate with rotating a roller, and a soft X-ray radiating device.

(g) a method for preparing a liquid crystal display element according to the above-mentioned item (e) wherein a washing and drying apparatus equipped with a transferring part which can transfer the transparent substrate within the apparatus, a washing and drying part which can jet clean gas with a pressure of 1 to 5 kg/cm² against the substrate and also remove unnecessary substances as well as a soft X-ray radiating device which is arranged in such a way as to make possible an irradiation of soft X-rays at an optional angle within 5 to 180 degrees against the transparent substrate is used.

(h) a method for preparing a liquid crystal display element according to the above-mentioned item (e) wherein a washing and drying apparatus equipped with first and the second soft X-ray radiating devices which can radiate front and rear positions of the washing and drying part, respectively, with soft X-ray is used.

(i) a method for preparing a liquid crystal display element according to the above-mentioned item (e) wherein a washing and drying apparatus equipped with a soft X-ray radiating device which can ionize clean gas to be jetted against the transparent substrate is used.

(j) a method for preparing a liquid crystal display element according to the above-mentioned item (e) wherein a washing and drying apparatus equipped with a nozzle body which can jet clean gas against the transparent substrate in an air-wiper way, a sucking device with a sucking window which can remove unnecessary materials and a soft X-ray radiating device is used.

(k) a method for preparing a liquid crystal display element according to the above-mentioned item (e) wherein a washing and drying apparatus equipped with a soft X-ray radiating device which can vary an angle between a transparent substrate surface and gas blown from a nozzle body within a range of from 30 to 60 degrees is used.

(l) a method for preparing a liquid crystal display element according to the above-mentioned item (e) wherein the energy of soft X-rays is 4 to 9.5 keV.

(m) a method for preparing a liquid crystal display element according to the above-mentioned item (e) wherein soft X-rays are radiated against an aligning film at a distance of 10 to 400 mm from a soft X-ray origin.

(n) a method for preparing a liquid crystal display element according to the above-mentioned item (e) wherein soft X-rays are radiated against an aligning film at a distance of 10 to 400 mm from a soft X-ray origin having an energy of 4 to 9.5 keV.

(o) a liquid crystal display element prepared by arranging a transparent electrode on a pair of transparent substrates, forming an aligning film consisting of an organic high molecular compound on the transparent electrode, treating the aligning film by a rubbing treatment, assembling the substrates to face each other with a spacer disposed therebetween, and then applying and sealing to a substrate a liquid crystal material which contains at least one compound expressed by the above-mentioned general formulae (1) or (2) wherein the aligning film is irradiated with soft X-rays after the rubbing treatment.

(p) a liquid crystal display element according to the preceding item wherein it is subjected to soft X-ray radiation having an energy of 4 to 9.5 keV.

(q) a liquid crystal display element according to the above-mentioned item (o) soft X-rays are radiated against an aligning film at a distance of 10 to 400 mm from a soft X-ray origin having an energy of 4 to 9.5 keV.

EXAMPLES

The invention is illustrated by the following examples and comparative examples in more detail, but the invention is not limited to them. Herein, a determination method of surface energy used in these examples is as follows.

Surface energy of the aligning film is determined by using two liquids, in which a polar component and a dispersive component are known, and determining a contact angle there-between to calculate surface energy.

The value of the contact angle is related to surface energy by means of the following equation.

There is shown the case in which equilibrium is established with a liquid having a surface energy, $\gamma_L$, on a solid surface (surface energy of solid is $\gamma_s$), at a contact angle $\theta$. In this case, an equation of Young is existent.

$$\gamma_s = \gamma_{SL} + \gamma_L \cos\theta \tag{1}$$

Herein, $\gamma_{SL}$ is the energy acting between a solid and a liquid and it relates to an interaction power at an interface. Work of adhesion can be expressed by $$Wa = \gamma_s + \gamma_L - \gamma_{SL} \tag{2}$$

which is then combined with equation (1) to obtain $$Wa = \gamma_L(1 + \cos\theta) \tag{3}$$

Then, surface energy is divided into a dispersive component ($\gamma^D$) and a polar component ($\gamma^P$) to obtain $$\gamma = \gamma^P + \gamma^D \tag{4}$$

Herein, supposing that the dispersive component of surface energy interacts only with the dispersive component and that the polar component of surface energy interacts only with the polar component, the following equation is obtained:

$$Wa = (\gamma_s^D \gamma_L^D)^{1/2} + (\gamma_s^P \gamma_L^P)^{1/2} \tag{5}$$

From equations (3) and (5), the following equation is obtained:

$$\gamma_L(1 + \cos\theta) = (\gamma_s^D \gamma_L^D)^{1/2} + (\gamma_s^P \gamma_L^P)^{1/2} \tag{6}$$

Thus, the dispersive component and the polar component of surface energy with respect to the substrate can be calculated by determining the contact angle with use of two liquids, in which polar component and dispersive component are known.

In the following examples, surface energies were obtained by using pure water ($H_2O$) and ethylene glycol (EG), in which surface energy values are known. Herein, values for the dispersive component and the polar component of surface energy used are as follows.

|        | $\gamma_L^D$ | $\gamma_L^P$ | $\gamma_L$        |
|--------|------|------|-------------------|
| $H_2O$ | 22.0 | 50.2 | 72.2 (erg cm$^{-2}$) |
| EG     | 29.3 | 19/0 | 48.3 (erg cm$^{-2}$) |

Example 1

3.46 g of 4,4'-diaminophenyl ether, 4.36 g of pyromellitic dianhydride and 0.11 g of paraaminophenyl trimethoxy silane were polymerized to obtain a solution of polyamic acid.

After the solution was diluted to a 3% by weight solution of polyamic acid by adding a mixed solution of butyl cellosolve (BC) and N-methyl-2-pyrrolidone (NMP) in 1:1 ratio by weight, the obtained solution was coated on a transparent glass substrate with an ITO electrode on one side by means of a spin coating method (a spinner method). Coating conditions were 3000 rpm and 15 seconds. After coating, it was dried at 100° C. for 10 minutes, thereafter the temperature was increased to 200° C. in an air oven for 1 hour, and it was heat treated at 200° C. for 90 minutes, to obtain a polyimide membrane with a membrane thickness of about 600 Angstroms on the substrate with the transparent electrode. By similar operations, five aligning films were obtained, which were supplied for the following tests.

The transparent glass substrate with the obtained polyimide formed membrane were subjected to a rubbing treatment by using an operating apparatus shown in FIGS. 1 to 3 under such conditions that the pile forcing amount of a rubbing cloth (pile length 1.9 mm: rayon) was 0.30 mm, the stage moving speed was 45 mm/sec and the roller rotation speed was 600 rpm.

Then, four transparent glass substrate which had been returned to a preparation and waiting position after being subjected to a rubbing treatment were irradiated with soft X-rays by the second soft X-ray radiating device (made by Hamamatsu Photonics Co., Ltd.: C4870 type) from a location disposed 50 mm in a vertical direction from the membrane surface. Herein, the tests were carried out under such conditions as 6 sec., 15 sec., 30 sec. and 60 sec. Static electricity of maximal 20 kV produced due to elevation of the substrate by means of an ejector pin on the stage was confirmed to be below 100 V by irradiation with soft X-rays. Energy of the soft X-ray radiating apparatus was 6 keV, and tubular voltage and tubular current thereof were 9.5 kV and 0.2 mA, respectively.

Surface energy of the membrane formed by the method was determined at room temperature immediately after the soft X-ray radiation treatment. Surface energy of the membrane was lowered rapidly according to the soft X-ray radiation time. Contact angles of membranes to pure water and ethylene glycol for the soft X-ray radiation time of 60 seconds were 67.1 degrees and 51.8 degrees, respectively, and the value of surface energy for the polar component was 23.7 erg cm$^{-2}$.

Analogously, a substrate irradiated with soft X-ray for 60 seconds was subjected to an ultrasonic wave washing treatment in pure water and a heating and drying treatment. A liquid crystal cell with a cell thickness of 6 micron and a twist angle of 2400° was constituted by using the substrate, and a liquid crystal for STN made by Chisso Corporation (trade name LIXON 4032-000XX) was then enclosed. After enclosure, it was subjected to an isotropic treatment at 120° C. for 30 minutes and cooled gradually to the room temperature, to obtain a liquid crystal element. Analogously ten liquid crystal elements were prepared and then existence of display unevenness was checked after turning on an electric current. There were observed display unevenness for all elements, in particular remarkable display unevenness for seven display elements was noted.

Comparative Example 1

Ten liquid crystal elements were prepared by the analogous method to Example 1 except that soft X-ray radiation was not used. Now, contact angles of the membrane to pure water and ethylene glycol for the soft X-ray radiation time of 60 seconds were 64.6 degrees and 51.4 degrees, respectively, and the value of surface energy for the polar components was 28.3 erg $cm^{-2}$.

Also, existence of display unevenness was checked after turning on electric current. There were observed display unevenness for all elements, in particular remarkable display unevenness for seven display elements was noted.

Figure 14:
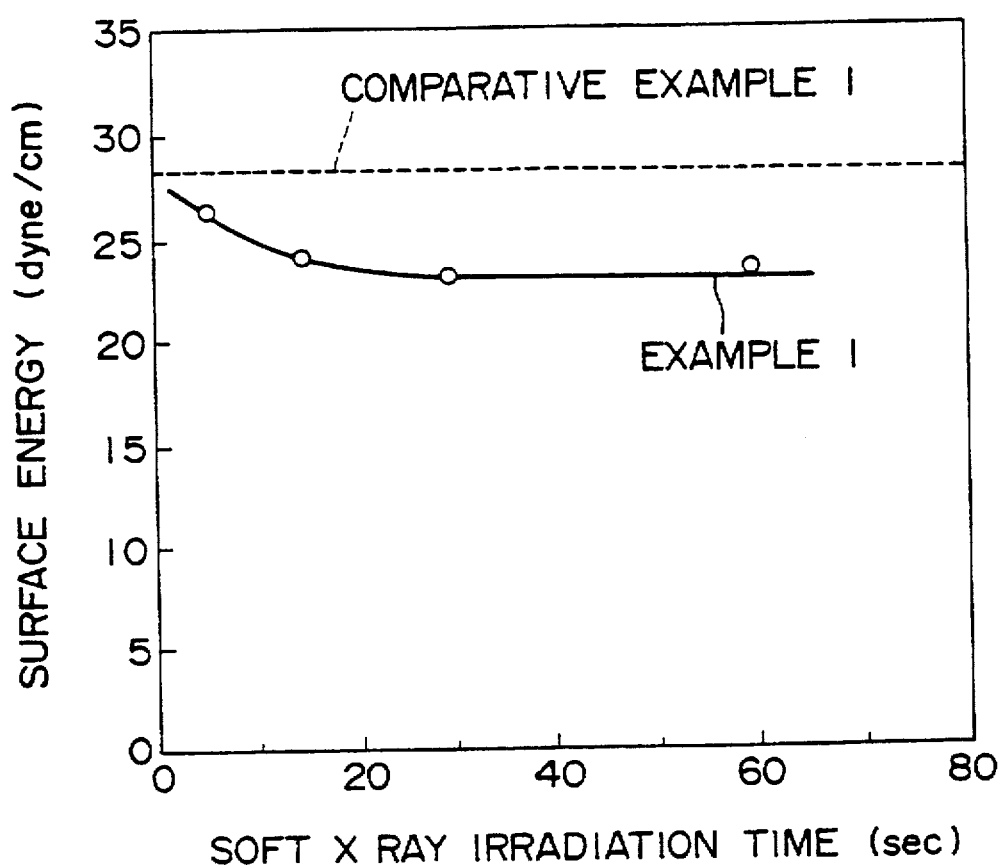
FIG. 14 shows a relationship between radiation times of soft X-ray and polar components of the surface energy obtained from Example 1 and Comparative Example 1.

In FIG. 14, there is shown a relationship between soft X-ray radiation times and polar components of surface energies obtained from Example 1 and Comparative Example 1. From FIG. 14, it is clear that the surface energy of the sample after soft X-ray radiation (Example 1) was less than that of the sample untreated with soft X-ray radiation (Comparative Example 1).

Example 2

7.43 g of 1,1-bis[4-(4-aminobenzyl)phenyl]-4-cyclohexane and 3.69 g of pyromellitic dianhydride were reacted with cooling in 50 g of dehydrated and purified NMP as a solvent. After 1 hour, 0.11 g of paraaminophenyl trimethoxy silane was added at 20° C. to react for 1 hour.

Thereafter, a reaction liquid was diluted with 51.1 g of NMP to obtain a 10% by weight transparent solution of polyamic acid. Viscosity of the solution at 25° C. was 1870 centipoises.

After the solution was diluted with a mixed solvent (1:1) of BC and NMP to obtain a 3% by weight solution of polyamic acid, it was coated on a transparent glass substrate with an ITO electrode on one side by means of a spin coating method (a spinner method). Coating conditions were 4500 rpm and 15 seconds. After coating, it was dried at 100° C. for 10 minutes, then heated to 200° C. for 1 hour in an air oven and subjected to a heat treatment at 200° C. for 90 minutes, to obtain five glass substrates mounted with polyimide membranes having a membrane thickness of about 600 Ångstroms.

Analogously to Example 1, the obtained aligning film was subjected to an aligning treatment with a rubbing cloth, and thereafter irradiated with soft X-rays by the second soft X-ray radiating device (made by Hamamatsu Photonics Co., Ltd.: C4870 type) from a location disposed 50 mm in a vertical direction to the membrane surface. Herein, the tests were carried out under conditions of 6 sec., 15 sec., 30 sec. and 60 sec. Static electricity of maximal 20 kV produced due to elevation of the substrate by means of an ejector pin on the stage was confirmed to be below 100 V by irradiation with soft X-rays. Energy of the soft X-ray radiating apparatus was 6 keV, and tubular voltage and tubular current thereof were 9.5 kV and 0.2 mA, respectively.

Surface energy of the membrane formed by the method was determined at room temperature immediately after the soft X-ray radiation treatment. Surface energy of the membrane was lowered rapidly according to the soft X-ray radiation time. Contact angles of the membrane to pure water and ethylene glycol for the soft X-ray radiation time of 60 seconds were 75.0 degrees and 54.2 degrees, respectively, and the value of surface energy for the polar component was 13.8 erg $cm^{-2}$.

The substrate obtained by irradiating with soft X-rays, as described above, for 60 seconds on the polyimide membrane prepared and subjected to a rubbing treatment under the same conditions was washed in pure water by means of an ultrasonic wave and then subjected to a heating and drying treatment. Ten liquid crystal cells with a cell thickness of 6 microns and a twist angle of 240° were constituted by using the said substrate, and liquid crystals for STN made by Chisso Corporation (trade name LIXON 4032-00XX) were enclosed. After enclosure, they were subjected to isotropic treatments at 120° C. for 30 minutes and cooled gradually to room temperature, to obtain liquid crystal elements. Existence of display unevenness was checked after turning on electric current. There was not observed any display unevenness for all elements.

Comparative Example 2

Ten liquid crystal elements were prepared by the analogous method to Example 2 except that soft X-ray radiation was not carried out.

Contact angles of membranes to pure water and ethylene glycol for the soft X-ray radiation time of 60 seconds were 73.4 degrees and 60.6 degrees, respectively, and the value of surface energy for the polar component was 21.1 erg $cm^{-2}$.

Also, existence of display unevenness was checked after turning on electric current. There were observed display unevenness for eight elements, in particular remarkable display unevenness for five display elements were noted.

Figure 15:
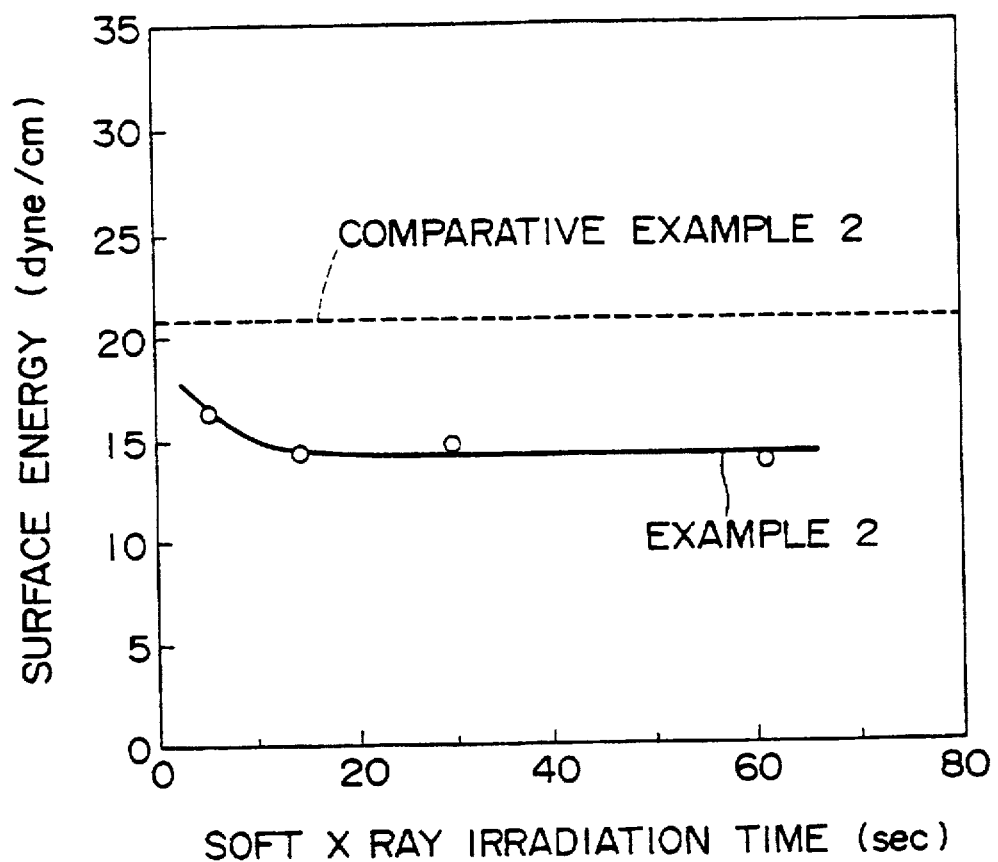
FIG. 15 shows a relationship between radiation times of soft X-ray and polar components of the surface energy obtained from Example 2 and Comparative Example 2.

In FIG. 15, there is shown a relationship between soft X-ray radiation times and polar components of surface energy obtained from Example 2 and Comparative Example 2. From FIG. 15, it is clear that surface energy of the sample after soft X-ray radiation (Example 2) was less than that of the sample untreated with soft X-ray radiation (Comparative Example 2).

Example 3

8.06 g of 2,2-bis[4-(4-aminophenoxy)phenyl]propane, 4.36 g of pyromellitic dianhydride and 0.11 g of paraaminophenyl trimethoxy silane were polymerized to obtain a solution of polyamic acid.

After the solution was diluted with a mixed solvent (1:1) of BC and NMP to obtain a 3% by weight solution of polyamic acid, it was coated on a transparent glass substrate with an ITO electrode on one side by means of a spin coating method (a spinner method). Coating conditions were 3000 rpm and 15 seconds. After coating, it was dried at 100° C. for 10 minutes, thereafter heated to 200° C. for 1 hour in an air oven and subjected to a heat treatment at 200° C. for 90 minutes, to obtain five glass substrates mounted with polyimide membranes having a membrane thickness of about 600 Ångstroms.

Analogously to Example 1, the obtained aligning film was subjected to an aligning treatment with a rubbing cloth, and thereafter irradiated with soft X-rays by the second soft X-ray radiating device made by Hamamatsu Photonics Co., Ltd. (C4870) from a location disposed 50 mm in a vertical direction to the membrane surface for 60 seconds. Static electricity of maximal 20 kV produced due to elevation of the substrate by means of an ejector pin on the stage was confirmed to be below 100V by radiation of soft X-ray. Energy of the soft X-ray radiating apparatus was 6 keV, and tubular voltage and tubular current thereof were 9.5 kV and 0.2 mA, respectively.

Surface energy of the membrane formed by the method was determined at room temperature immediately after the soft X-ray radiation treatment. Surface energy of the membrane was lowered rapidly according to a soft X-ray radiation time. Contact angles of the membrane to pure water and ethylene glycol were 71.0 degrees and 55.2 degrees, respectively, and the value of surface energy for the polar component was 20.5 erg $cm^{-2}$.

The obtained polyimide membrane was subjected to an ultrasonic wave washing treatment in pure water and a heating and drying treatment. A liquid crystal cell having a cell thickness of 6 micron and a twist angle of 240° was constituted by using the substrate, and a liquid crystal for STN made by Chisso Corporation (trade name LIXON 4032-00XX) was enclosed. After enclosure, it was subjected to an isotropic treatment at 120° C. for 30 minutes and cooled gradually to room temperature, to obtain a liquid crystal element.

Analogously, ten liquid crystal elements were prepared and then existence of display unevenness was checked after turning on electric current. There was slight display unevenness for two elements, but there was not noticed any display unevenness for eight other elements.

Comparative Example 3

Ten liquid crystal elements were prepared by the analogous method to Example 3 except that soft X-ray irradiation was not carried out. Herein, contact angles of membranes to pure water and ethylene glycol were 65.6 degrees and 50.4 degrees, respectively, and the value of surface energy for the polar component was 25.6 erg $cm^{-2}$.

Also, existence of display unevenness was checked after turning on an electric current. There were observed display unevenness for all elements, in particular remarkable display unevenness for seven display elements was noted.

Example 4

7.05 g of 1,1-bis[4-(4-aminophenoxy)phenyl]-4-trans-4-ethylcyclohexane, 2.18 g of pyromellitic dianhydride, 0.65 g of cyclobutane tetracarboxylic acid and 0.09 g of paraaminophenyl trimethoxy silane were polymerized to obtain a solution of polyamic acid.

After the solution was diluted with a mixed solvent (1:1) of BC and NMP to obtain a 3% by weight solution of polyamic acid, it was coated on a transparent glass substrate mounted with an ITO electrode on one side by means of a spin coating method (a spinner method). Coating conditions were 3000 rpm and 15 seconds. After coating, it was dried at 100° C. for 10 minutes, thereafter heated to 200° C. for 1 hour in an air oven and subjected to a heat treatment at 200° C. for 90 minutes, to obtain a glass substrate mounted with polyimide membrane having a membrane thickness of about 600 Ångstroms.

Analogously to Example 1, the obtained aligning film was subjected to an aligning treatment with a rubbing cloth, and thereafter radiated with soft X-rays by the second soft X-ray radiation device made by Hamamatsu Photonics Co., Ltd. (C4870) from a location disposed 50 mm in a vertical direction to the membrane surface for 60 seconds. Static electricity of maximal 20 kV produced due to elevation of the substrate by means of an ejector pin on the stage was confirmed to be below 100 V by irradiation with soft X-rays. Energy of the soft X-ray radiating apparatus was 6 keV, and tubular voltage and tubular current thereof were 9.5 kV and 0.2 mA, respectively.

Surface energy of the membrane formed by the method was determined at the room temperature immediately after the soft X-ray radiation treatment. Contact angles of the membrane to pure water and ethylene glycol were 69.8 degrees and 54.9 degrees, respectively, and the value of surface energy for the polar component was 22.3 erg $cm^{-2}$.

The obtained polyimide membrane was subjected to an ultrasonic wave washing treatment in pure water and a heating and drying treatment. A liquid crystal cell having a cell thickness of 6 micron and a twist angle of 240° was constituted by using the substrate, and a liquid crystal for STN made by Chisso Corporation (trade name LIXON 4032-000XX) was enclosed. After enclosure, it was subjected to an isotropic treatment at 120° C. for 30 minutes and cooled gradually to room temperature, to obtain a liquid crystal element.

Analogously, ten liquid crystal elements were prepared and then existence of display unevenness was checked after turning on electric current. There was slight display unevenness for three elements, but there was not noticed any display unevenness for seven other elements.

Comparative Example 4

Ten liquid crystal elements were prepared by the analogous method to Example 4 except that soft X-ray irradiation was not carried out. Contact angles of membranes to pure water and ethylene glycol were 65.0 degrees and 50.9 degrees, respectively, and the value of surface energy for the polar component was 27.1 erg $cm^{-2}$.

Also, existence of display unevenness was checked after turning on electric current. There was observed display unevenness for all elements, in particular remarkable display unevenness for eight display elements was noted.

Example 5

3.46 g of 4,4'-diaminophenyl ether, 4.36 g of pyromellitic dianhydride and 0.11 g of paraaminophenyl trimethoxy silane were polymerized to obtain a solution of polyamic acid.

After the solution was diluted with a mixed solvent (1:1) of BC and NMP to a obtain 3% by weight solution of polyamic acid, it was coated on a transparent glass substrate mounted with an ITO electrode on one side by means of a spin coating method (a spinner method). Coating conditions were 3000 rpm and 15 seconds. After coating, it was dried at 100° C. for 10 minutes, thereafter heated to 200° C. for 1 hour in an air oven and subjected to a heat treatment at 200° C. for 90 minutes, to obtain five glass substrates mounted with polyimide membranes having a membrane thickness of about 600 Ångstroms.

The obtained transparent glass substrates mounted with polyimide membranes were subjected to a rubbing treatment analogously to Example 1 except that soft X-ray radiation was not carried out.

Then, the rubbed transparent glass substrate was subjected to an ultrasonic washing treatment, and thereafter set on a stage 115 of a washing and drying device shown in FIGS. 4 to 6 in a preparation position and radiated with soft X-rays by the first soft X-ray radiation device 107a (107) (made by Hamamatsu Photonics Co., Ltd.: C4870 type) for 3 seconds. Now, static electricity of about 2 kV produced due to the previous steps or due to substrate conveying was confirmed to be below 300 V.

Then, the substrate was subjected to a dry washing in clean air by setting a clean air pressure in slit head 135 of 3.0 $kg/cm^2$, a flow rate of 200 nl/min, a stage moving speed of 50 mm/sec and a sucked displacement of 2500 nl/min, and thereafter a substrate 103 placed in an exhaust position was radiated with soft X-rays by the second soft X-ray radiation device 107b (107) (made by Hamamatsu Photonics Co., Ltd.: C4870 type) for 5 seconds. Static electricity of above 20 kV produced at the dry washing and drying time and the conveying time to roller conveyer 121 was confirmed to be below 200 V. Energy of the soft X-ray radiating apparatus was 6 keV, and tubular voltage and tubular current thereof were 9.5 kV and 0.2 mA, respectively.

Surface energy of the membrane formed by the said method was determined at room temperature immediately after the soft X-ray radiation treatment by means of the second soft X-ray radiation device. Contact angles of the membrane to pure water and ethylene glycol were 67.2 degrees and 51.4 degrees, respectively, and the value of surface energy for the polar component was 23.2 erg cm$^{-2}$.

A liquid crystal cell having a cell thickness of 6 micron and a twist angle of 240° was constituted by using the substrate, and a liquid crystal for STN made by Chisso Corporation (trade name LIXON 4032-000XX) was enclosed. After enclosure, it was subjected to an isotropic treatment at 120° C. for 30 minutes and cooled gradually to room temperature, to obtain a liquid crystal element.

Analogously, ten liquid crystal elements were prepared and then existence of display unevenness was checked after turning on an electric current. There was slight display unevenness for three elements, but there was not noticed any display unevenness for seven other elements.

Comparative Example 5

Ten liquid crystal elements were prepared by the analogous method to Example 5 except that soft X-ray radiation was not carried out. Herein, contact angles of membranes to pure water and ethylene glycol were 64.6 degrees and 51.4 degrees, respectively, and the value of surface energy for the polar component was 28.3 erg cm$^{-2}$.

Also, existence of display unevenness was checked after turning on electric current. There was observed display unevenness for all elements, in particular remarkable display unevenness for seven display elements was noted.

Advantages of the Invention

As illustrated above, by a method for radiating soft X-rays against an aligning film which has been subjected to an aligning treatment, it is possible that display unevenness of a liquid crystal display element is lowered to improve display qualities of a liquid crystal display apparatus and that static electricity is removed to improve the yield of product.

What we claim is:

1. A method for preparing a liquid crystal display element comprising:

arranging a transparent electrode on each of a pair of transparent substrates;

forming an aligning film consisting of an organic high molecular weight compound on said transparent electrodes;

rubbing said aligning film;

assembling said substrates to face each other with a spacer disposed therebetween;

placing a liquid crystal material between said substrates; and irradiating said aligning film with soft X-rays passing through a gas.

2. The method for preparing a liquid crystal display element according to claim 1 including irradiating said aligning film for at least 2 seconds.

3. The method for preparing a liquid crystal display element according to claim 1 including irradiating said aligning film with soft X-rays no earlier than during rubbing using an aligning apparatus for liquid crystals including:

a cylindrical roller parallel to a transparent substrate surface and adjustable in position with respect to the substrate surface;

a driver for moving said roller in a specified direction relative to said transparent substrate while rotating said roller; and a soft X-ray radiating device.

4. The method for preparing a liquid crystal display element according to claim 1 comprising washing and drying said substrates using a washing and drying device before assembling said substrates.

5. The method for preparing a liquid crystal display element according to claim 4 wherein said washing and drying device includes:

a transferring part for transferring said transparent substrate within said washing and drying device;

a washing and drying part for jetting clean gas at a pressure of 1 to 5 kg/cm$^2$ against the substrate for drying said substrate; and a soft X-ray radiating device for irradiating the transparent substrate with soft X-rays at an angle in the range of 5 to 180 degrees relative to the transparent substrate.

6. The method for preparing a liquid crystal display element according to claim 5 wherein said washing and drying device includes first and second soft X-ray radiating devices for irradiating front and rear positions, respectively, of the washing and drying part.

7. The method for preparing a liquid crystal display element according to claim 5 wherein said soft X-ray radiating device ionizes clean gas jetted against said transparent substrate.

8. The method for preparing a liquid crystal display element according to claim 5 wherein said washing and drying device includes:

a nozzle body for jetting clean gas against said transparent substrate;

a vacuum device for drying said substrate; and a soft X-ray radiating device.

9. The method for preparing a liquid crystal display element according to claim 8 wherein said nozzle body jets clean gas against said transparent substrate at an angle within a range of from 30 to 60 degrees relative to said transparent substrate.

10. The method for preparing a liquid crystal display element according to claim 5 wherein the energy of said soft X-rays is 1.25 to 9.5 keV.

11. The method for preparing a liquid crystal display element according to claim 5 wherein the energy of said soft X-rays is 4 to 9.5 keV.

12. The method for preparing a liquid crystal display element according to claim 5 wherein the aligning film and a source of soft X-rays are separated by no more than 1500 mm.

13. The method for preparing a liquid crystal display element according to claim 1 wherein said liquid crystal material is a liquid crystal mixture containing at least one compound expressed by general formula (2) or general formula (3)

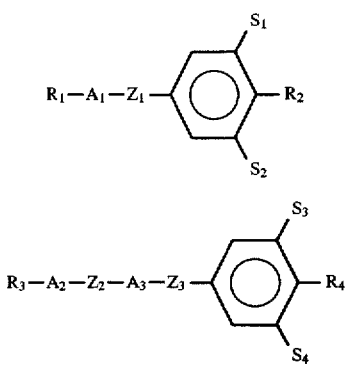

(2)

(3)

wherein, $R_1$ and $R_3$ represent independently a straight chain alkyl group with 1 to 10 carbon atoms or an alkyl group with 2 to 10 carbon atoms; $R_2$ and $R_4$ represent independently a straight chain alkyl or alkyl or alkyloxy group, each with 1 to 10 carbon atoms, —CN, a fluorine atom, a chlorine atom, —CF$_3$, —CHF$_2$, —OCF$_3$, or —OCHF$_2$; $S_1$, $S_2$, $S_3$, and $S_4$ represent independently a hydrogen atom, a fluorine atom, a chlorine atom, —CF$_3$, —CHF$_2$, —OCF$_3$, or —OCHF$_2$; $Z_1$, $Z_2$ and $Z_3$ represent independently —COO—, —CH$_2$CH$_2$—, —C≡C—, or a single bond; $A_1$, $A_2$ and $A_3$ represent independently

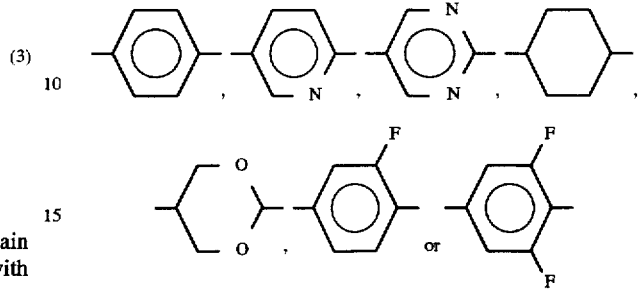

* * * * *